(12) United States Patent
Bateman

(10) Patent No.: US 7,928,363 B2
(45) Date of Patent: *Apr. 19, 2011

(54) MASS SPECTROMETER

(75) Inventor: Robert Harold Bateman, Cheshire (GB)

(73) Assignee: Micromass UK Limited, Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/094,661

(22) PCT Filed: Nov. 23, 2006

(86) PCT No.: PCT/GB2006/004370
§ 371 (c)(1),
(2), (4) Date: Sep. 16, 2008

(87) PCT Pub. No.: WO2007/060427
PCT Pub. Date: May 31, 2007

(65) Prior Publication Data
US 2009/0014639 A1  Jan. 15, 2009

Related U.S. Application Data

(60) Provisional application No. 60/739,269, filed on Nov. 23, 2005.

(30) Foreign Application Priority Data

Nov. 23, 2005 (GB) .................................. 0523812.6

(51) Int. Cl.
*B01D 59/44* (2006.01)
(52) U.S. Cl. .................... 250/283; 250/281; 250/282
(58) Field of Classification Search .................... None
See application file for complete search history.

(56) References Cited

U.S. PATENT DOCUMENTS 4,851,669 A  7/1989  Aberth
(Continued)

FOREIGN PATENT DOCUMENTS

EP  1043676  10/2000
(Continued)

OTHER PUBLICATIONS

Yost et al, "Tandem Quadrupole Mass Spectrometry", John Wiley & Sons, 1983, pp. 175-195, Ch. 8.
Huang et al, "Characterization of Cyclodextrins Using Ion-evaporation Atmospheric-pressure Ionization Tandem Mass Spectrometry", Rapid Communications in Mass Spectrometry, 1990, pp. 467-471, vol. 4, No. 11.

(Continued)

*Primary Examiner* — Bernard E Souw
*Assistant Examiner* — Andrew Smyth
(74) *Attorney, Agent, or Firm* — Jamie H. Rose

(57) ABSTRACT

A method is disclosed of identifying parent ions by matching daughter ions found to be produced at substantially the same time that the parent ions elute from a mixture. Ions emitted from an ion source (1) are transmitted to a fragmentation device (4) comprising an Electron Capture Dissociation, an Electron Transfer Dissociation or a Surface Induced Dissociation fragmentation device. The fragmentation device (4) is alternately and repeatedly switched between a first mode wherein the ions are substantially fragmented to produce daughter ions and a second mode wherein the ions are not substantially fragmented. Mass spectra are taken in both modes. At the end of an experimental run parent and daughter ions are recognized by comparing the mass spectra obtained in the two different modes. Daughter ions are matched to particular parent ions on the basis of the closeness of fit of their elution times, and this enables parent ions then to be identified.

19 Claims, 10 Drawing Sheets

U.S. PATENT DOCUMENTS

| | | | |
|---|---|---|---|
| 5,036,014 A * | 7/1991 | ElSohly et al. | 436/8 |
| 5,073,713 A | 12/1991 | Smith et al. | |
| 5,885,841 A | 3/1999 | Higgs, Jr. et al. | |
| 5,910,655 A | 6/1999 | Skilling | |
| 6,107,623 A | 8/2000 | Bateman et al. | |
| 6,204,500 B1 | 3/2001 | Whitehouse et al. | |
| 6,323,482 B1 | 11/2001 | Clemmer et al. | |
| 6,489,608 B1 * | 12/2002 | Skilling | 250/281 |
| 6,586,727 B2 | 7/2003 | Bateman et al. | |
| 6,717,130 B2 | 4/2004 | Bateman et al. | |
| 6,835,927 B2 | 12/2004 | Becker et al. | |
| 6,982,414 B2 | 1/2006 | Bateman et al. | |
| 6,992,283 B2 * | 1/2006 | Bateman et al. | 250/287 |
| 7,112,784 B2 | 9/2006 | Bateman et al. | |
| 7,196,326 B2 * | 3/2007 | Franzen et al. | 250/288 |
| 7,388,197 B2 * | 6/2008 | McLean et al. | 250/293 |
| 7,534,622 B2 * | 5/2009 | Hunt et al. | 436/173 |
| 2001/0052569 A1 | 12/2001 | Bateman et al. | |
| 2002/0053545 A1 | 5/2002 | Greef | |
| 2002/0063206 A1 * | 5/2002 | Bateman et al. | 250/281 |
| 2002/0115056 A1 | 8/2002 | Goodlett et al. | |
| 2002/0119490 A1 | 8/2002 | Aebersold et al. | |
| 2004/0041091 A1 | 3/2004 | Bateman et al. | |
| 2004/0155180 A1 | 8/2004 | Zubarev | |
| 2004/0180446 A1 * | 9/2004 | Thompson et al. | 436/86 |
| 2004/0188603 A1 | 9/2004 | Bateman et al. | |
| 2004/0245452 A1 * | 12/2004 | Bateman et al. | 250/287 |
| 2005/0092911 A1 * | 5/2005 | Hoyes | 250/282 |
| 2005/0199804 A1 * | 9/2005 | Hunt et al. | 250/290 |
| 2005/0279931 A1 * | 12/2005 | Franzen et al. | 250/290 |
| 2006/0024720 A1 * | 2/2006 | McLean et al. | 435/6 |
| 2007/0278397 A1 * | 12/2007 | Bateman et al. | 250/286 |
| 2008/0044915 A1 * | 2/2008 | Hunt et al. | 436/89 |
| 2009/0173877 A1 * | 7/2009 | Bateman et al. | 250/282 |
| 2009/0194688 A1 * | 8/2009 | Bateman et al. | 250/292 |

FOREIGN PATENT DOCUMENTS

| | | |
|---|---|---|
| EP | 1047107 | 10/2000 |
| EP | 1598666 | 11/2005 |
| GB | 2300967 | 11/1996 |
| GB | 2363249 | 12/2001 |
| GB | 2364168 | 1/2002 |
| GB | 2391699 | 2/2004 |
| GB | 2392303 | 2/2004 |
| GB | 2394545 | 4/2004 |
| WO | 02/096540 | 12/2002 |
| WO | 03/095978 | 11/2003 |
| WO | 03/102545 | 12/2003 |
| WO | 2004/049385 | 10/2004 |

OTHER PUBLICATIONS

Morris et al, "A Novel Geometry Mass Spectrometer, the Q-TOF, for Low-Femtomole/Attomole-Range Biopolymer Sequencing", Journal of Protein Chemistry, 1997, pp. 469-479, vol. 16, No. 5.

Morris et al, "High Sensitivity Collisionally-activated Decomposition Tandem Mass Spectrometry on a Novel Quadrupole/Orthogonal-acceleration Time-of-flight Mass Spectrometer", Rapid Communications in Mass Spectrometry, 1996, pp. 889-896, vol. 10.

Borchers et al, "Preliminary comparison of precursor scans and liquid chromatography—tandem mass spectrometry on a hybrid quadrupole time-of-flight mas spectrometer", Journal of Chromatography, 1999, pp. 119-130, vol. 854.

Charlwood et al, "Structural Characterisation of N-Linked Glycan Mixtures by Precursor Ion Scanning and Tandem Mass Spectrometric Analysis", Rapid Communications in Mass Spectrometry, 1999, pp. 1522-1530, vol. 13.

Hopfgartner et al, "Exact Mass Measurement of Product Ions for the Structural Elucidation of Drug Metabolites with a Tandem Quadrupole Orthogonal-Acceleration Time-of-Flight Mass Spectrometer", Journal of American Society for Mass Spectrometry, 1999, pp. 1305-1314, vol. 10.

Gulcicek et al, "Structural Elucidation in the Millisecond Time Frame Using Fast In-Source CID API Time-of-Flight MS", ASMS Conference 1998 Book of Abstracts, pp. 891.

De Hoffman, Edmond, "Tandem Mass Spectrometry: a Primer", Journal of Mass Spectrometry, 1995, pp. 129-137, vol. 31.

Kang H D et al: "Radical detection in a methane plasma", J. Vac. Sci. Technol. A vol. 21, No. 6, Nov./Dec. 2003 (Nov. 2003), pp. 1978-1980, XP007900816.

Preuss, R. et al: "Quantitative analysis of multicomponent mass spectra", AIP Conference Proceedings AIP USA, No. 617, 2002, pp. 155-162, XP007900817.

Hellerstein, M. K. et al: "Mass isotopomer distribution analysis at eight years: theoretical, analytic and experimental considerations", American Physiology:, vol. 276, No. 39, 1999, pp. E1146-E1170, XP002978087.

Bylund, D. et al: "Chromatographic alignment by warping and dynamic programming as a pre-processing tool for PARAFAC modelling of liquid chromatography—mass spectrometry data", J. of Chromatography A, 961, No. 2, Jul. 5, 2002, pp. 237-244, XP004370624.

Jain, A. K. et al: "Statistical Pattern Recognition: A Review", IEEE Transactions On Pattern Analysis and Machine Intelligence, IEEE Service Center, Los Alamitos, CA, US, vol. 22, No. 1, Jan. 2000, pp. 4-37, XP000936788, ISSN: 0162-8828, pp. 29-31.

* cited by examiner

MASS SPECTROMETER

CROSS REFERENCE TO RELATED APPLICATIONS

This application is the National Stage of International Application No. PCT/GB2006/004370, filed on Nov. 23, 2006, which claims priority to and benefit of U.S. Provisional Patent Application Ser. No. 60/739,269, filed on Nov. 23, 2005 and priority to and benefit of United Kingdom Patent Application No. 0523812.6, filed Nov. 23, 2005. The entire contents of these applications are incorporated herein by reference.

The present invention relates to a method of mass spectrometry and a mass spectrometer.

Tandem mass spectrometry (MS/MS) is the name given to the method of mass spectrometry wherein parent or precursor ions generated from a sample are selected by a first mass filter/analyser and are then passed to a collision cell wherein they are fragmented by collisions with neutral gas molecules to yield daughter or product ions. The fragment or daughter ions are then mass analysed by a second mass filter/analyser and the resulting fragment or daughter ion spectra can be used to determine the structure and hence identify the parent or precursor ion. Tandem mass spectrometry is particularly useful for the analysis of complex mixtures such as biomolecules since it avoids the need for chemical clean-up prior to mass spectral analysis.

A particular form of tandem mass spectrometry referred to as parent or precursor ion scanning is known wherein in a first step the second mass filter/analyser is arranged to act as a mass filter so that it will only transmit and detect fragment or daughter ions having a specific mass to charge ratio. The specific mass to charge ratio is set so as to correspond with the mass to charge ratio of fragment or daughter ions which are known to be characteristic products which result from the fragmentation of a particular parent or precursor ion or type of parent or precursor ion. The first mass filter/analyser upstream of the collision cell is then scanned whilst the second mass filter/analyser remains fixed to monitor for the presence of fragment or daughter ions having the specific mass to charge ratio. The parent or precursor ion mass to charge ratios which yield the characteristic fragment or daughter ions can then be determined. As a second step, a complete fragment or daughter ion spectrum for each of the parent or precursor ion mass to charge ratios which produce characteristic fragment or daughter ions may then be obtained by operating the first mass filter/analyser so that it selects parent or precursor ions having a particular mass to charge ratio and then scanning the second mass filter/analyser to record the resulting full fragment or daughter ion spectrum. This can then be repeated for the other parent or precursor ions of interest. Parent ion scanning is useful when it is not possible to identify parent or precursor ions in a direct mass spectrum due to the presence of chemical noise which is frequently encountered, for example, in the Electrospray mass spectra of biomolecules.

Triple quadrupole mass spectrometers having a first quadrupole mass filter/analyser, a quadrupole collision cell into which a collision gas is introduced, and a second quadrupole mass filter/analyser are well known.

Another type of mass spectrometer referred to as a hybrid quadrupole-Time of Flight mass spectrometer is known wherein the second quadrupole mass filter/analyser is replaced by an orthogonal acceleration Time of Flight mass analyser.

As will be shown below, these types of mass spectrometers when used to perform conventional methods of parent or precursor ion scanning and subsequently obtaining a fragment or daughter ion spectrum of a candidate parent or precursor ion suffer from low duty cycles which render them unsuitable for use in applications which require a higher duty cycle such as on-line chromatography applications.

Quadrupoles have a duty cycle of approximately 100% when being used as a mass filter but their duty cycle drops to around 0.1% when then are used in a scanning mode as a mass analyser, for example, to mass analyse a mass range of 500 mass units with peaks one mass unit wide at their base.

Orthogonal acceleration Time of Flight analysers typically have a duty cycle within the range 1-20% depending upon the relative mass to charge values of the different ions in the spectrum. However, the duty cycle remains the same irrespective of whether the Time of Flight analyser is being used as a mass filter to transmit ions having a particular mass to charge ratio or whether the Time of Flight analyser is being used to record a full mass spectrum. This is due to the nature of operation of Time of Flight analysers. When used to acquire and record a fragment or daughter ion spectrum the duty cycle of a Time of Flight analyser is typically around 5%.

To a first approximation the conventional duty cycle when seeking to discover candidate parent or precursor ions using a triple quadrupole mass spectrometer is approximately 0.1% (the first quadrupole mass filter/analyser is scanned with a duty cycle of 0.1% and the second quadrupole mass filter/analyser acts as a mass filter with a duty cycle of 100%). The duty cycle when then obtaining a fragment or daughter ion spectrum for a particular candidate parent or precursor ion is also approximately 0.1% (the first quadrupole mass filter/analyser acts as a mass filter with a duty cycle of 100%, and the second quadrupole mass filter/analyser is scanned with a duty cycle of approximately 0.1%). The resultant duty cycle therefore of discovering a number of candidate parent or precursor ions and producing a daughter spectrum of one of the candidate parent or precursor ions is approximately 0.1%/2 (due to a two stage process with each stage having a duty cycle of 0.1%)=0.05%.

The duty cycle of a quadrupole-Time of Flight mass spectrometer for discovering candidate parent or precursor ions is approximately 0.005% (the quadrupole is scanned with a duty cycle of approximately 0.1% and the Time of Flight analyser acts a mass filter with a duty cycle of approximately 5%). Once candidate parent or precursor ions have been discovered, a fragment or daughter ion spectrum of a candidate parent or precursor ion can be obtained with an duty cycle of 5% (the quadrupole acts as a mass filter with a duty cycle of approximately 100% and the Time of Flight analyser is scanned with a duty cycle of 5%). The resultant duty cycle therefore of discovering a number of candidate parent or precursor ions and producing a daughter spectrum of one of the candidate parent or precursor ions is approximately 0.005% (since 0.005%<<5%).

As can be seen, a triple quadrupole mass spectrometer has approximately an order higher duty cycle than a quadrupole-Time of Flight mass spectrometer for performing conventional methods of parent or precursor ion scanning and obtaining confirmatory fragment or daughter ion spectra of discovered candidate parent or precursor ions. However, such duty cycles are not high enough to be used practically and efficiently when analysing real time data which is required when the source of ions is the eluent from a chromatography device.

Electrospray and Laser Desorption techniques have made it possible to generate molecular ions having very high molecular weights and Time of Flight mass analysers are advantageous for the analysis of such large mass biomolecules by virtue of their high efficiency at recording a full mass spectrum. They also have a high resolution and mass accuracy.

Other forms of mass analysers such as quadrupole ion traps are similar in some ways to Time of Flight analysers in that like Time of Flight analysers they can not provide a continuous output and hence have a low efficiency if used as a mass filter to continuously transmit ions which is an important feature of the conventional methods of parent or precursor ion scanning. Both Time of Flight mass analysers and quadrupole ion traps may be termed "discontinuous output mass analysers".

It is desired to provide an improved method of mass spectrometry and an improved mass spectrometer.

According to an aspect of the present invention there is provided a method of mass spectrometry comprising the steps of:

(a) passing parent or precursor ions to a collision, fragmentation or reaction device comprising an Electron Capture Dissociation fragmentation device;

(b) operating the Electron Capture Dissociation device in a first mode of operation wherein at least some of the parent or precursor ions are fragmented upon interacting with electrons to produce fragment or daughter ions;

(c) recording a mass spectrum of the fragment or daughter ions as a first mass spectrum;

(d) switching, altering or varying the Electron Capture Dissociation fragmentation device to operate in a second mode wherein substantially fewer parent or precursor ions are fragmented;

(e) recording a mass spectrum of ions emerging from or which have been transmitted through the Electron Capture Dissociation fragmentation device operating in the second mode as a second mass spectrum; and (f) repeating steps (b)-(e) a plurality of times.

According to the preferred embodiment the parent or precursor ions comprise doubly, triply, quadruply charged ions or ions having five or more charges.

According to the preferred embodiment the Electron Capture Dissociation fragmentation device is preferably repeatedly switched between the first and second modes during a single experimental run or during a single analysis of a sample.

According to the preferred embodiment in the first mode of operation the electrons are arranged to have an energy selected from the group consisting of: (i) <1 eV; (ii) 1-2 eV; (iii) 2-3 eV; (iv) 3-4 eV; and (v) 4-5 eV.

The electrons are preferably confined by a magnetic field. Ions to be fragmented are preferably confined within an ion guide. An AC or RF voltage is preferably applied to the electrodes of the ion guide in order to create a radial pseudo-potential field or well which preferably acts to confine ions radially within the ion guide. The relatively low energy electrons are preferably confined by a relatively strong magnetic field and the magnetic field and the ion guiding region of the ion guide are preferably overlapped or superimposed so that multiply charged analyte ions are caused to interact with the relatively low energy electrons. Fragmentation of ions by Electron Capture Dissociation preferably does not involve causing internal vibrational energy to be introduced to the ions.

An electron source is preferably provided and in the first mode of operation the electron source preferably generates a plurality of electrons which are preferably arranged to interact with the parent or precursor ions. In the second mode of operation the electron source is preferably switched OFF so that analyte ions preferably do not interact with any electrons and hence preferably are not caused to fragment.

According to another aspect of the present invention there is provided a method of mass spectrometry comprising the steps of:

(a) passing parent or precursor ions to a collision, fragmentation or reaction device comprising an Electron Transfer Dissociation fragmentation device;

(b) operating the Electron Transfer Dissociation fragmentation device in a first mode of operation wherein at least some of the parent or precursor ions are fragmented upon interacting with reagent ions to produce fragment or daughter ions;

(c) recording a mass spectrum of the fragment or daughter ions as a first mass spectrum;

(d) switching, altering or varying the Electron Transfer Dissociation fragmentation device to operate in a second mode wherein substantially fewer parent or precursor ions are fragmented;

(e) recording a mass spectrum of ions emerging from or which have been transmitted through the Electron Transfer Dissociation fragmentation device operating in the second mode as a second mass spectrum; and (f) repeating steps (b)-(e) a plurality of times.

According to the preferred embodiment the parent or precursor ions comprise doubly, triply, quadruply charged ions or ions having five or more charges.

According to the preferred embodiment the Electron Transfer Dissociation fragmentation device is repeatedly switched between the first and second modes during a single experimental run or during a single analysis of a sample.

According to another aspect of the present invention there is provided a method of mass spectrometry comprising the steps of:

(a) passing parent or precursor ions to a collision, fragmentation or reaction device comprising a Surface Induced Dissociation fragmentation device;

(b) operating the Surface Induced Dissociation fragmentation device in a first mode of operation wherein at least some of the parent or precursor ions are fragmented upon impinging upon a surface or target plate;

(c) recording a mass spectrum of the fragment or daughter ions as a first mass spectrum;

(d) switching, altering or varying the Surface Induced Dissociation fragmentation device to operate in a second mode wherein substantially fewer parent or precursor ions are fragmented;

(e) recording a mass spectrum of ions emerging from or which have been transmitted through the Surface Induced Dissociation fragmentation device operating in the second mode as a second mass spectrum; and (f) repeating steps (b)-(e) a plurality of times.

According to the preferred embodiment the parent or precursor ions comprise doubly, triply, quadruply charged ions or ions having five or more charges.

According to the preferred embodiment the Surface Induced Dissociation fragmentation device is repeatedly switched between the first and second modes during a single experimental run or during a single analysis of a sample.

In the first mode of operation the parent or precursor ions may be directed, diverted or deflected on to the surface or target plate. In the second mode of operation the parent or precursor ions preferably are not directed, diverted or deflected on to the surface or target plate i.e. the ions may preferably be onwardly transmitted through or past the Surface Induced Dissociation fragmentation device without being diverted and without being caused to fragment.

The surface or target plate may comprise a self-assembled monolayer. The surface or target plate may comprise a fluorocarbon or hydrocarbon monolayer.

The surface or target plane is preferably arranged in a plane which is substantially parallel to the direction of travel of the parent or precursor ions in the second mode of operation i.e. when ions are preferably transmitted past the surface or target plate without being directed on to the surface or target plate.

According to another aspect of the present invention there is provided a method of mass spectrometry comprising the steps of:

(a) passing parent or precursor ions to a collision, fragmentation or reaction device selected from the group consisting of: (i) an Electron Collision or Impact Dissociation fragmentation device; (ii) a Photo Induced Dissociation ("PID") fragmentation device; (iii) a Laser Induced Dissociation fragmentation device; (iv) an infrared radiation induced dissociation device; (v) an ultraviolet radiation induced dissociation device; (vi) a nozzle-skimmer interface fragmentation device; (vii) an in-source fragmentation device; (viii) an ion-source Collision Induced Dissociation fragmentation device; (ix) a thermal or temperature source fragmentation device; (x) an electric field induced fragmentation device; (xi) a magnetic field induced fragmentation device; (xii) an enzyme digestion or enzyme degradation fragmentation device; (xiii) an ion-ion reaction fragmentation device; (xiv) an ion-molecule reaction fragmentation device; (xv) an ion-atom reaction fragmentation device; (xvi) an ion-metastable ion reaction fragmentation device; (xvii) an ion-metastable molecule reaction fragmentation device; (xviii) an ion-metastable atom reaction fragmentation device; (xix) an ion-ion reaction device for reacting ions to form adduct or product ions; (xx) an ion-molecule reaction device for reacting ions to form adduct or product ions; (xxi) an ion-atom reaction device for reacting ions to form adduct or product ions; (xxii) an ion-metastable ion reaction device for reacting ions to form adduct or product ions; (xxiii) an ion-metastable molecule reaction device for reacting ions to form adduct or product ions; and (xxiv) an ion-metastable atom reaction device for reacting ions to form adduct or product ions;

(b) operating the collision, fragmentation or reaction device in a first mode of operation wherein at least some of the parent or precursor ions are fragmented or reacted to produce fragment, daughter, product or adduct ions;

(c) recording a mass spectrum of the fragment, daughter, product or adduct ions as a first mass spectrum;

(d) switching, altering or varying the collision, fragmentation or reaction device to operate in a second mode wherein substantially fewer parent or precursor ions are fragmented or reacted;

(e) recording a mass spectrum of ions emerging from or which have been transmitted through the collision, fragmentation or reaction device operating in the second mode as a second mass spectrum; and (f) repeating steps (b)-(e) a plurality of times.

According to the preferred embodiment the parent or precursor ions comprise doubly, triply, quadruply charged ions or ions having five or more charges.

A reaction device should be understood as comprising a device wherein ions, atoms or molecules are rearranged or reacted so as to form a new species of ion, atom or molecule. An X-Y reaction fragmentation device should be understood as meaning a device wherein X and Y combine to form a product which then fragments. This is different to a fragmentation device per se wherein ions may be caused to fragment without first forming a product. An X-Y reaction device should be understood as meaning a device wherein X and Y combine to form a product and wherein the product does not necessarily then fragment.

According to the present invention ions are collided, fragmented or reacted in a device other than a Collision Induced Dissociation fragmentation device. According to a particularly preferred embodiment an Electron Capture Dissociation ("ECD") or an Electron Transfer Dissociation ("ETD") fragmentation device are used to fragment analyte ions.

Polypeptide chains are made up of amino acid residues which have certain masses. There are three different bonds along a peptide backbone and when a bond is broken the charge may remain either at the N-terminal part of the structure or the C-terminal part of the structure. When a polypeptide is fragmented there are six possible fragmentation series which are commonly referred to as: a, b, c and x, y, z.

With Collision Induced Dissociation the most common fragmentation route is for fragmentation to occur through the amide bond (II). If the charge remains on the N-terminal then the ion is referred to as a b series ion. If the charge remains on the C-terminal then the ion is referred to as a y series ion.

Subscripts may be used to indicate how many amino acids residues are contained in the fragment. For example, $b_3$ is the fragment ion resulting from cleavage of the amide bond (II) such that charge remains on the N-terminal and wherein there are 3 amino acid residues in the fragment.

According to an embodiment of the present invention when an Electron Capture Dissociation ("ECD") or an Electron Transfer Dissociation ("ETD") fragmentation device is used to fragment ions then the polypeptide chain can be fragmented at different positions to those positions where fragmentation would be expected to occur if the polypeptide were fragmented by Collision Induced Dissociation. In particular, an Electron Capture Dissociation ("ECD") or an Electron Transfer Dissociation ("ETD") device enable x and c series fragment ions predominantly to be produced. In certain circumstances it is particularly advantageous to cause ions to fragment into x and c series fragment ions rather than b and y series fragment ions (as would be the case by Collision Induced Dissociation). In some situations a more complete sequence is possible using ECD or ETD and there can also be less ambiguity in identifying fragment ions. This can make the process of sequencing the peptide easier.

Polypeptides may also be modified by Post Translational Modifications such as phosphorylation. The use of an ECD or ETD fragmentation device and the resulting fragmentation series which are produced enables Post Translational Modifications such as phosphorylation to be more easily observed. It is also possible to make a determination as to where the modification occurs along the length of the polypeptide.

According to another embodiment the collision, fragmentation or reaction device may comprise a Surface Induced Dissociation fragmentation device. Collision Induced Dissociation can be viewed as being a relatively slow process in that fragmentation is often the result of multiple collisions between ions and gas molecules. As a result fragmentation tends to be averaged out and a relatively broad range of fragmentation products are typically observed. In contrast, Surface Induced Dissociation can be viewed as being a relatively sudden or instantaneous process. As a result a polypeptide may fragment in a very specific manner. In certain situations this can be particularly useful since it can reveal certain useful information about the structure of the polypeptide.

It will therefore be appreciated that the present invention is particularly advantageous in that parent or precursor ions are preferably fragmented via different fragmentation routes to those that may be obtained by Collision Induced Dissociation. Furthermore, the present invention also enables Post Translational Modifications of peptides to be observed and a determination to be made as to where the modification sits in the peptide. The present invention is also particularly advantageous compared to conventional approaches to fragmenting analyte ions and attempting to elucidate structural information relating to the analyte ions by analysing the corresponding fragment ions.

The preferred method preferably involves automatically switching, altering or varying the collision, fragmentation or reaction device between at least the first mode and the second mode at least once every 0.1, 0.2, 0.3, 0.4, 0.5, 0.6, 0.7, 0.8, 0.9, 1, 2, 3, 4, 5, 6, 7, 8, 9 or 10 seconds.

The method preferably further comprises the step of recognising parent or precursor ions. According to the preferred embodiment parent or precursor ions may be recognised by comparing a first mass spectrum with a second mass spectrum obtained at substantially the same time and recognising as parent or precursor ions, ions having a greater intensity in the second mass spectrum relative to the first mass spectrum.

The method preferably further comprises the step of recognising fragment, product, daughter or adduct ions. Fragment, product, daughter or adduct ions may be recognised by comparing a first mass spectrum with a second mass spectrum obtained at substantially the same time; and recognising as fragment, product, daughter or adduct ions, ions having a greater intensity in the first mass spectrum relative to the second mass spectrum.

The method preferably further comprises the step of selecting a sub-group of possible candidate parent or precursor ions from all the parent or precursor ions. This may comprise the step of selecting possible candidate parent or precursor ions on the basis of their relationship to a predetermined fragment, product, daughter or adduct ion.

The method preferably further comprises the steps of generating a predetermined fragment, product, daughter or adduct ion mass chromatogram for the predetermined fragment, product, daughter or adduct ion using first mass spectra; determining the centre of each peak in the predetermined fragment, product, daughter or adduct ion mass chromatogram; and determining the corresponding predetermined fragment, product, daughter or adduct ion elution time(s).

The method preferably further comprises, for each peak in the predetermined fragment, product, daughter or adduct ion mass chromatogram, the steps of: interrogating both the second mass spectrum obtained immediately before the predetermined fragment, product, daughter or adduct ion elution time and the second mass spectrum obtained immediately after the predetermined fragment, product, daughter or adduct ion elution time for the presence of previously recognised parent or precursor ions; generating a possible candidate parent or precursor ion mass chromatogram for any previously recognised parent or precursor ions found to be present in both the second mass spectrum obtained immediately before the predetermined fragment, product, daughter or adduct ion elution time and the second mass spectrum obtained immediately after the predetermined fragment, product, daughter or adduct ion elution time; determining the centre of each peak in each the possible candidate parent or precursor ion mass chromatogram; and determining the corresponding possible candidate parent or precursor ions elution time(s).

According to the preferred embodiment the method further comprises the step of ranking possible candidate parent or precursor ions according to the closeness of fit of their elution time with the predetermined fragment, product, daughter or adduct ion elution time.

The method preferably further comprises the step of forming a list of final candidate parent or precursor ions from the possible candidate parent or precursor ions by rejecting possible candidate parent or precursor ions if the elution time of a possible candidate parent or precursor ions precedes or exceeds the predetermined fragment, product, daughter or adduct ion elution time by more than a predetermined amount.

According to an embodiment the method may comprise selecting possible candidate parent or precursor ions on the basis of their giving rise to a predetermined mass loss. The method preferably further comprises, for each second mass spectrum, the steps of: generating a list of target fragment, product, daughter or adduct ion mass to charge values that would result from the loss of a predetermined ion or neutral particle from each previously recognised parent or precursor ion present in the second mass spectrum; interrogating both the first mass spectrum obtained immediately before the second mass spectrum and the first mass spectrum obtained immediately after the second mass spectrum for the presence of fragment, product, daughter or adduct ions having a mass to charge value corresponding with a the target fragment, product, daughter or adduct ion mass to charge value; and forming a list of possible candidate parent or precursor ions, optionally together with their corresponding fragment, product, daughter or adduct ions, by including in the list a parent or precursor ions if a fragment, product, daughter or adduct ion having a mass to charge value corresponding with a the target fragment, product, daughter or adduct ion mass to charge value is found to be present in both the first mass spectrum immediately before the second mass spectrum and the first mass spectrum immediately after the second mass spectrum.

According to an embodiment the method further comprises the steps of: generating a mass loss chromatogram based upon possible candidate parent or precursor ions and their corresponding fragment, product, daughter or adduct ions; determining the centre of each peak in the mass loss chromatogram; and determining the corresponding mass loss elution time(s).

The method preferably further comprises, for each possible candidate parent or precursor ion: generating a possible candidate parent or precursor ion mass chromatogram for the possible candidate parent or precursor ions using the second mass spectra; generating a corresponding fragment, product, daughter or adduct ion mass chromatogram for the corresponding fragment, product, daughter or adduct ion; determining the centre of each peak in the possible candidate parent or precursor ion mass chromatogram and the corresponding fragment, product, daughter or adduct ion mass chromatogram; and determining the corresponding possible candidate parent or precursor ions elution time(s) and corresponding fragment, product, daughter or adduct ion elution time(s).

The method preferably further comprises the step of forming a list of final candidate parent or precursor ions from the possible candidate parent or precursor ions by rejecting possible candidate parent or precursor ions if the elution time of a possible candidate parent or precursor ions precedes or exceeds the corresponding fragment, product, daughter or adduct ion elution time by more than a predetermined amount.

According to the preferred embodiment the method preferably further comprises the step of identifying each final candidate parent or precursor ion.

The method preferably further comprises, for each final candidate parent or precursor ion, the steps of: recalling the elution time of the final candidate parent or precursor ions; generating a list of possible candidate fragment, product, daughter or adduct ions which comprises previously recognised fragment, product, daughter or adduct ions which are present in both the second mass spectrum obtained immediately before the elution time of the final candidate parent or precursor ions and the second mass spectrum obtained immediately after the elution time of the final candidate parent or precursor ions; generating a possible candidate fragment, product, daughter or adduct ion mass chromatogram of each possible candidate fragment, product, daughter or adduct ion; determining the centre of each peak in each the possible candidate fragment, product, daughter or adduct ion mass chromatogram; and determining the corresponding possible candidate fragment, product, daughter or adduct ion elution time(s).

According to an embodiment the method preferably further comprises the step of ranking possible candidate fragment, product, daughter or adduct ions according to the closeness of fit of their elution time with the elution time of the final candidate parent or precursor ions.

The method preferably further comprises the step of forming a list of final candidate fragment, product, daughter or adduct ions from the possible candidate fragment, product, daughter or adduct ions by rejecting possible candidate fragment, product, daughter or adduct ions if the elution time of the possible candidate fragment, product, daughter or adduct ion precedes or exceeds the elution time of the final candidate parent or precursor ions by more than a predetermined amount.

The method preferably further comprises the steps of: generating a list of neighbouring parent or precursor ions which are present in the second mass spectrum obtained nearest in time to the elution time of the final candidate parent or precursor ions; generating a neighbouring parent or precursor ion mass chromatogram of each parent or precursor ions contained in the list; determining the centre of each neighbouring parent or precursor ion mass chromatogram; and determining the corresponding neighbouring parent or precursor ions elution time(s).

The method preferably further comprises rejecting from the list of final candidate fragment, product, daughter or adduct ions any final candidate fragment, product, daughter or adduct ion having an elution time which corresponds more closely with a neighbouring parent or precursor ion's elution time than with the elution time of the final candidate parent or precursor ions.

According to an embodiment the method preferably further comprises the step of assigning final candidate fragment, product, daughter or adduct ions to the final candidate parent or precursor ions according to the closeness of fit of their elution times.

The method preferably further comprises the step of listing all final candidate fragment, product, daughter or adduct ions which have been associated with the final candidate parent or precursor ions.

According to an embodiment the method preferably further comprises the step of: generating a parent or precursor ion mass chromatogram for each recognised parent or precursor ion; determining the centre of each peak in the parent or precursor ion mass chromatogram; determining the corresponding parent or precursor ion's elution time(s); generating a fragment, product, daughter or adduct ion mass chromatogram for each recognised fragment, product, daughter or adduct ion; determining the centre of each peak in the fragment, product, daughter or adduct ion mass chromatogram; and determining the corresponding fragment, product, daughter or adduct ion elution time(s).

The method preferably further comprises assigning fragment, product, daughter or adduct ions to parent or precursor ions according to the closeness of fit of their respective elution times.

According to an embodiment the method preferably further comprising the step of listing all fragment, product, daughter or adduct ions which have been associated with each parent or precursor ion.

The method preferably further comprises passing ions generated by an ion source through a mass filter prior to passing them to or transmitting them through the collision, fragmentation or reaction device, the mass filter substantially transmitting ions having a mass to charge value falling within a certain range and substantially attenuating ions having a mass to charge value falling outside of the range.

According to an embodiment the method further comprises recognising ions as fragment, product, daughter or adduct ions if the ions are present in a first mass spectrum and have a mass to charge value falling outside of the range.

The method preferably further comprises the step of recognising parent or precursor ions and fragment, product, daughter or adduct ions from the first and second mass spectra. The method preferably further comprises the steps of: generating a parent or precursor ion mass chromatogram for each parent or precursor ion; determining the centre of each peak in the parent or precursor ion mass chromatogram; determining the corresponding parent or precursor ions elution time(s); generating a fragment, product, daughter or adduct ion mass chromatogram for each fragment, product, daughter or adduct ion; determining the centre of each peak in the fragment, product, daughter or adduct ion mass chromatogram; and determining the corresponding fragment, product, daughter or adduct ion elution time(s).

The method preferably further comprises assigning fragment, product, daughter or adduct ions to parent or precursor ions according to the closeness of fit of their respective elution times. The method preferably further comprises providing a mass filter having a mass to charge ratio transmission window upstream of the collision, fragmentation, or reaction device. According to an embodiment the method further comprises recognising fragment, product, daughter or adduct ions by recognising ions present in a first spectrum having a mass to charge value which falls outside of the transmission window of the mass filter.

The method preferably further comprises identifying a parent or precursor ion on the basis of the mass to charge ratio of the parent or precursor ion.

The method preferably further comprises identifying a parent or precursor ions on the basis of the mass to charge ratio of one or more fragment, product, daughter or adduct ions.

According to an embodiment the method preferably further comprises identifying a protein by determining the mass to charge ratio of one or more parent or precursor ions, the one or more parent or precursor ions comprising peptides of the protein.

The method preferably further comprises identifying a protein by determining the mass to charge ratio of one or more fragment, product, daughter or adduct ions, the one or more fragment, product, daughter or adduct ions comprising fragments of peptides of the protein.

According to an embodiment the method further comprises searching the mass to charge ratios of the one or more parent or precursor ions and/or the one or more fragment, product, daughter or adduct ions against a database, the database comprising known proteins. The method preferably further comprises searching the mass to charge ratio of the one or more parent or precursor ions against a database, the database comprising known proteins.

The method preferably further comprises searching first mass spectra for the presence of fragment, product, daughter or adduct ions which might be expected to result from the fragmentation of a parent or precursor ions.

According to an embodiment the predetermined amount is selected from the group comprising: (i) 0.25 seconds; (ii) 0.5 seconds; (iii) 0.75 seconds; (iv) 1 second; (v) 2.5 seconds; (vi) 5 seconds; (vii) 10 seconds; and (viii) a time corresponding to 5% of the width of a chromatography peak measured at half height.

A gas comprising helium, argon, nitrogen or methane may be introduced into the collision, fragmentation or reaction device.

According to an aspect of the present invention there is provided a mass spectrometer comprising:

a collision, fragmentation or reaction device comprising an Electron Capture Dissociation fragmentation device, the Electron Capture Dissociation fragmentation device being operable in a first mode of operation wherein at least some of the parent or precursor ions are fragmented upon interacting with electrons to produce fragment or daughter ions and a second mode of operation wherein substantially fewer parent or precursor ions are fragmented;

a mass analyser; and control means arranged and adapted to repeatedly switch, alter or vary the Electron Capture Dissociation fragmentation device back and forth between the first and second modes of operation.

According to an aspect of the present invention there is provided a mass spectrometer comprising:

a collision, fragmentation or reaction device comprising an Electron Transfer Dissociation fragmentation device, the Electron Transfer Dissociation fragmentation device being operable in a first mode of operation wherein at least some of the parent or precursor ions are fragmented upon interacting with reagent ions to produce fragment or daughter ions and a second mode of operation wherein substantially fewer parent or precursor ions are fragmented;

a mass analyser; and control means arranged and adapted to repeatedly switch, alter or vary the Electron Transfer Dissociation fragmentation device back and forth between the first and second modes of operation.

According to an aspect of the present invention there is provided a mass spectrometer comprising:

a collision, fragmentation or reaction device comprising a Surface Induced Dissociation fragmentation device, the Surface Induced Dissociation fragmentation device being operable in a first mode of operation wherein at least some of the parent or precursor ions are fragmented upon impinging upon a surface or target plate to produce fragment or daughter ions and a second mode of operation wherein substantially fewer parent or precursor ions are fragmented;

a mass analyser; and control means arranged and adapted to repeatedly switch, alter or vary the Surface Induced Dissociation fragmentation device back and forth between the first and second modes of operation.

According to an aspect of the present invention there is provided a mass spectrometer comprising:

a collision, fragmentation or reaction device, the collision, fragmentation or reaction device being operable in a first mode of operation wherein at least some of the parent or precursor ions are fragmented or reacted to produce fragment, daughter, product or adduct ions and a second mode of operation wherein substantially fewer parent or precursor ions are fragmented or reacted;

a mass analyser; and control means arranged and adapted to repeatedly switch, alter or vary the collision, fragmentation or reaction device back and forth between the first and second modes of operation;

wherein the collision, fragmentation or reaction device is selected from the group consisting of: (i) an Electron Collision or Impact Dissociation fragmentation device; (ii) a Photo Induced Dissociation ("PID") fragmentation device; (iii) a Laser Induced Dissociation fragmentation device; (iv) an infrared radiation induced dissociation device; (v) an ultraviolet radiation induced dissociation device; (vi) a nozzle-skimmer interface fragmentation device; (vii) an in-source fragmentation device; (viii) an ion-source Collision Induced Dissociation fragmentation device; (ix) a thermal or temperature source fragmentation device; (x) an electric field induced fragmentation device; (xi) a magnetic field induced fragmentation device; (xii) an enzyme digestion or enzyme degradation fragmentation device; (xiii) an ion-ion reaction fragmentation device; (xiv) an ion-molecule reaction fragmentation device; (xv) an ion-atom reaction fragmentation device; (xvi) an ion-metastable ion reaction fragmentation device; (xvii) an ion-metastable molecule reaction fragmentation device; (xviii) an ion-metastable atom reaction fragmentation device; (xix) an ion-ion reaction device for reacting ions to form adduct or product ions; (xx) an ion-molecule reaction device for reacting ions to form adduct or product ions; (xxi) an ion-atom reaction device for reacting ions to form adduct or product ions; (xxii) an ion-metastable ion reaction device for reacting ions to form adduct or product ions; (xxiii) an ion-metastable molecule reaction device for reacting ions to form adduct or product ions; and (xxiv) an ion-metastable atom reaction device for reacting ions to form adduct or product ions.

The mass spectrometer preferably comprises an ion source. The ion source is preferably selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ("AP-MALDI") ion source; and (xviii) a Thermospray ion source.

According to a particularly preferred embodiment the ion source may comprise either an Electrospray, Atmospheric Pressure Chemical Ionization or a Matrix Assisted Laser Desorption Ionization ("MALDI") ion source. Such ion sources may be provided with an eluent over a period of time, the eluent having been separated from a mixture by means of liquid chromatography or capillary electrophoresis.

Alternatively, the ion source may comprise an Electron Impact, Chemical Ionization or Field Ionisation ion source. Such ion sources may be provided with an eluent over a period of time, the eluent having been separated from a mixture by means of gas chromatography.

A mass filter, preferably a quadrupole mass filter, may be provided upstream of the collision, fragmentation or reaction device. However, a mass filter is not essential to the present invention. The mass filter may be arranged to operate with a highpass filter characteristic. The mass filter may, for example, be arranged to transmit ions having a mass to charge ratio selected from the group comprising: (i) ≧100; (ii) ≧150; (iii) ≧200; (iv) ≧250; (v) ≧300; (vi) ≧350; (vii) ≧400; (viii) ≧450; and (ix) ≧500. Alternatively, the mass filter may be arranged to have a lowpass or bandpass filter characteristic.

The mass spectrometer preferably further comprises an ion guide provided upstream and/or downstream of the collision, fragmentation or reaction device. The ion guide is preferably selected from the group consisting of:

(i) a multipole rod set or a segmented multipole rod set ion trap or ion guide comprising a quadrupole rod set, a hexapole rod set, an octapole rod set or a rod set comprising more than eight rods;

(ii) an ion tunnel or ion funnel ion trap or ion guide comprising a plurality of electrodes or at least 2, 5, 10, 20, 30, 40, 50, 60, 70, 80, 90 or 100 electrodes having apertures through which ions are transmitted in use, wherein at least 5%, 10%, 15%, 20%, 25%, 30%, 35%, 40%, 45%, 50%, 55%, 60%, 65%, 70%, 75%, 80%, 85%, 90%, 95% or 100% of the electrodes have apertures which are of substantially the same size or area or which have apertures which become progressively larger and/or smaller in size or in area;

(iii) a stack or array of planar, plate or mesh electrodes, wherein the stack or array of planar, plate or mesh electrodes comprises a plurality or at least 2, 3, 4, 5, 6, 7, 8, 9, 10, 11, 12, 13, 14, 15, 16, 17, 18, 19 or 20 planar, plate or mesh electrodes and wherein at least 5%, 10%, 15%, 20%, 25%, 30%, 35%, 40%, 45%, 50%, 55%, 60%, 65%, 70%, 75%, 80%, 85%, 90%, 95% or 100% of the planar, plate or mesh electrodes are arranged generally in the plane in which ions travel in use; and (iv) an ion trap or ion guide comprising a plurality of groups of electrodes arranged axially along the length of the ion trap or ion guide, wherein each group of electrodes comprises: (a) a first and a second electrode and means for applying a DC voltage or potential to the first and second electrodes in order to confine ions in a first radial direction within the ion guide; and (b) a third and a fourth electrode and means for applying an AC or RF voltage to the third and fourth electrodes in order to confine ions in a second radial direction (which is preferably orthogonal to the first radial direction) within the ion guide.

According to the preferred embodiment the ion trap or ion guide comprises an ion tunnel or ion funnel ion trap or ion guide wherein at least 5%, 10%, 15%, 20%, 25%, 30%, 35%, 40%, 45%, 50%, 55%, 60%, 65%, 70%, 75%, 80%, 85%, 90%, 95% or 100% of the electrodes have internal diameters or dimensions selected from the group consisting of: (i) ≦1.0 mm; (ii) ≦2.0 mm; (iii) ≦3.0 mm; (iv) ≦4.0 mm; (v) ≦5.0 mm; (vi) ≦6.0 mm; (vii) ≦7.0 mm; (viii) ≦8.0 mm; (ix) ≦9.0 mm; (x) ≦10.0 mm; and (xi) >10.0 mm.

The ion trap or ion guide preferably further comprises first AC or RF voltage means arranged and adapted to apply an AC or RF voltage to at least 5%, 10%, 15%, 20%, 25%, 30%, 35%, 40%, 45%, 50%, 55%, 60%, 65%, 70%, 75%, 80%, 85%, 90%, 95% or 100% of the plurality of electrodes of the ion trap or ion guide in order to confine ions radially within the ion trap or ion guide. The first AC or RF voltage means is preferably arranged and adapted to apply an AC or RF voltage having an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak. The first AC or RF voltage means is preferably arranged and adapted to apply an AC or RF voltage having a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

According to an embodiment the ion trap or ion guide is arranged and adapted to receive a beam or group of ions and to convert or partition the beam or group of ions such that a plurality or at least 1, 2, 3, 4, 5, 6, 7, 8, 9, 10, 11, 12, 13, 14, 15, 16, 17, 18, 19 or 20 separate packets of ions are confined and/or isolated in the ion trap or ion guide at any particular time. Each packet of ions is preferably separately confined and/or isolated in a separate axial potential well formed within the ion trap or ion guide.

The mass spectrometer preferably further comprises means arranged and adapted to urge at least some ions upstream and/or downstream through or along at least 5%, 10%, 15%, 20%, 25%, 30%, 35%, 40%, 45%, 50%, 55%, 60%, 65%, 70%, 75%, 80%, 85%, 90%, 95% or 100% of the axial length of the ion trap or ion guide in a mode of operation.

The mass spectrometer may comprise first transient DC voltage means arranged and adapted to apply one or more transient DC voltages or potentials or one or more transient DC voltage or potential waveforms to the electrodes forming the ion trap or ion guide in order to urge at least some ions upstream and/or downstream along at least 5%, 10%, 15%, 20%, 25%, 30%, 35%, 40%, 45%, 50%, 55%, 60%, 65%, 70%, 75%, 80%, 85%, 90%, 95% or 100% of the axial length of the ion trap or ion guide.

According to a less preferred embodiment the mass spectrometer may comprise AC or RF voltage means arranged and adapted to apply two or more phase-shifted AC or RF voltages to electrodes forming the ion trap or ion guide in order to urge at least some ions upstream and/or downstream along at least 5%, 10%, 15%, 20%, 25%, 30%, 35%, 40%, 45%, 50%, 55%, 60%, 65%, 70%, 75%, 80%, 85%, 90%, 95% or 100% of the axial length of the ion trap or ion guide.

The mass spectrometer preferably comprises means arranged and adapted in a mode of operation to maintain at least a portion of the ion trap or ion guide at a pressure selected from the group consisting of: (i) >0.0001 mbar; (ii) >0.001 mbar; (iii) >0.01 mbar; (iv) >0.1 mbar; (v) >1 mbar; (vi) >10 mbar; (vii) >1 mbar; (viii) 0.0001-100 mbar; and (ix) 0.001-10 mbar.

The mass analyser preferably comprises either a quadrupole mass filter, a Time of Flight mass analyser (preferably an orthogonal acceleration Time of Flight mass analyser), an ion trap, a magnetic sector analyser or a Fourier Transform Ion Cyclotron Resonance ("FTICR") mass analyser.

According to an embodiment the collision, fragmentation or reaction device may include a quadrupole rod set, a hexapole rod set or an octopole rod set ion guide. Neighbouring rods are preferably maintained at substantially the same DC voltage and an AC or RF voltage is preferably applied to the rods. The collision, fragmentation or reaction device may form a substantially gas-tight enclosure apart from an ion entrance, an ion exit aperture and optionally a port for introducing gas into the collision, fragmentation or reaction device. A gas such as helium, argon, nitrogen, air or methane may be introduced into the collision, fragmentation or reaction device.

Parent or precursor ions that belong to a particular class of parent or precursor ions and which are recognisable by a characteristic daughter or fragment ion or characteristic "neutral loss" are traditionally discovered by the methods of "parent or precursor ion" scanning or "constant neutral loss" scanning.

Previous methods for recording "parent or precursor ion" scans or "constant neutral loss" scans involve scanning one or both quadrupoles in a triple quadrupole mass spectrometer, or scanning the quadrupole in a tandem quadrupole orthogonal acceleration Time of Flight mass spectrometer, or scanning at least one element in other types of tandem mass spectrometers. As a consequence, these methods suffer from the low duty cycle associated with scanning instruments. As a further consequence, information may be discarded and lost whilst the mass spectrometer is occupied recording a "parent or precursor ion" scan or a "constant neutral loss" scan. As a further consequence these methods are not appropriate for use where the mass spectrometer is required to analyse substances eluting directly from gas or liquid chromatography equipment.

According to an embodiment, a tandem quadrupole orthogonal Time of Flight mass spectrometer is used in a way in which candidate parent or precursor ions are discovered using a method in which sequential relatively low fragmentation or reaction mass spectra followed by relatively high fragmentation or reaction mass spectra are recorded. The switching back and forth of the collision, fragmentation or reaction device is preferably not interrupted. Instead a complete set of data is preferably acquired and this is then preferably processed afterwards. Fragment, product, daughter or adduct ions may be associated with parent or precursor ions by closeness of fit of their respective elution times. In this way candidate parent or precursor ions may be confirmed or otherwise without interrupting the acquisition of data and information need not be lost.

Once an experimental run has been completed, the relatively high fragmentation or reaction mass spectra and the relatively low fragmentation or reaction mass spectra may then be post-processed. Parent or precursor ions may be recognised by comparing a high fragmentation or reaction mass spectrum with a low fragmentation or reaction mass spectrum obtained at substantially the same time, and noting ions having a greater intensity in the low fragmentation or reaction mass spectrum relative to the high fragmentation or reaction mass spectrum. Similarly, fragment, product, daughter or adduct ions may be recognised by noting ions having a greater intensity in the high fragmentation or reaction mass spectrum relative to the low fragmentation or reaction mass spectrum.

Once a number of parent or precursor ions have been recognised, a sub-group of possible candidate parent or precursor ions may be selected from all of the parent or precursor ions.

According to one embodiment, possible candidate parent or precursor ions may be selected on the basis of their relationship to a predetermined fragment, product, daughter or adduct ion. The predetermined fragment, product, daughter or adduct ion may comprise, for example, ions selected from the group comprising: (i) immonium ions from peptides; (ii) functional groups including phosphate group $PO_3^-$ ions from phosphorylated peptides; and (iii) mass tags which are intended to cleave from a specific molecule or class of molecule and to be subsequently identified thus reporting the presence of the specific molecule or class of molecule.

A parent or precursor ion may be short listed as a possible candidate parent or precursor ion by generating a mass chromatogram for the predetermined fragment, product, daughter or adduct ion using high fragmentation or reaction mass spectra. The centre of each peak in the mass chromatogram is then determined together with the corresponding predetermined fragment, product, daughter or adduct ion elution time(s). Then for each peak in the predetermined fragment, product, daughter or adduct ion mass chromatogram both the low fragmentation or reaction mass spectrum obtained immediately before the predetermined fragment, product, daughter or adduct ion elution time and the low fragmentation or reaction mass spectrum obtained immediately after the predetermined fragment, product, daughter or adduct ion elution time are interrogated for the presence of previously recognised parent or precursor ions. A mass chromatogram for any previously recognised parent or precursor ion found to be present in both the low fragmentation or reaction mass spectrum obtained immediately before the predetermined fragment, product, daughter or adduct ion elution time and the low fragmentation or reaction mass spectrum obtained immediately after the predetermined fragment, product, daughter or adduct ion elution time is then generated and the centre of each peak in each mass chromatogram is determined together with the corresponding possible candidate parent or precursor ion elution time(s). The possible candidate parent or precursor ions may then be ranked according to the closeness of fit of their elution time with the predetermined fragment, product, daughter or adduct ion elution time, and a list of final candidate parent or precursor ions may be formed by rejecting possible candidate parent or precursor ions if their elution time precedes or exceeds the predetermined fragment, product, daughter or adduct ion elution time by more than a predetermined amount.

According to an alternative embodiment, a parent or precursor ion may be shortlisted as a possible candidate parent or precursor ion on the basis of it giving rise to a predetermined mass loss. For each low fragmentation or reaction mass spectrum, a list of target fragment, product, daughter or adduct ion mass to charge values that would result from the loss of a predetermined ion or neutral particle from each previously recognised parent or precursor ion present in the low fragmentation or reaction mass spectrum may be generated. Then both the high fragmentation or reaction mass spectrum obtained immediately before the low fragmentation or reaction mass spectrum and the high fragmentation or reaction mass spectrum obtained immediately after the low fragmentation or reaction mass spectrum are interrogated for the presence of fragment, product, daughter or adduct ions having a mass to charge value corresponding with a target fragment, product, daughter or adduct ion mass to charge value. A list of possible candidate parent or precursor ions (optionally including their corresponding fragment, product, daughter or adduct ions) may then formed by including in the list a parent or precursor ion if a fragment, product, daughter or adduct ion having a mass to charge value corresponding with a target fragment, product, daughter or adduct ion mass to charge value is found to be present in both the high fragmentation or reaction mass spectrum immediately before the low fragmentation or reaction mass spectrum and the high fragmentation or reaction mass spectrum immediately after the low fragmentation or reaction mass spectrum. A mass loss chromatogram may then be generated based upon possible candidate parent or precursor ions and their corresponding fragment, product, daughter or adduct ions. The centre of each peak in the mass loss chromatogram may be determined together with the corresponding mass loss elution time(s). Then for each possible candidate parent or precursor ion a mass chromatogram is generated using the low fragmentation or reaction mass spectra. A corresponding fragment, product, daughter or adduct ion mass chromatogram may also be generated for the corresponding fragment, product, daughter or adduct ion. The centre of each peak in the possible candidate parent or precursor ion mass chromatogram and the corresponding fragment, product, daughter or adduct ion mass chromatogram are then determined together with the corresponding possible candidate parent or precursor ion elution time(s) and corresponding fragment, product, daughter or adduct ion elution time(s). A list of final candidate parent or precursor ions may then be formed by rejecting possible candidate parent or precursor ions if the elution time of a possible candidate parent or precursor ion precedes or exceeds the corresponding fragment, product, daughter or adduct ion elution time by more than a predetermined amount.

Once a list of final candidate parent or precursor ions has been formed (which preferably comprises only some of the originally recognised parent or precursor ions and possible candidate parent or precursor ions) then each final candidate parent or precursor ion can then be identified.

Identification of parent or precursor ions may be achieved by making use of a combination of information. This may include the accurately determined mass or mass to charge ratio of the parent or precursor ion. It may also include the masses or mass to charge ratios of the fragment ions. In some instances the accurately determined masses of the fragment, product, daughter or adduct ions may be preferred. It is known that a protein may be identified from the masses or mass to charge ratios, preferably the exact masses or mass to charge ratios, of the peptide products from proteins that have been enzymatically digested. These may be compared to those expected from a library of known proteins. It is also known that when the results of this comparison suggest more than one possible protein then the ambiguity can be resolved by analysis of the fragments of one or more of the peptides.

The preferred embodiment allows a mixture of proteins, which have been enzymatically digested, to be identified in a single analysis. The masses or mass to charge ratios, or exact masses or mass to charge ratios, of all the peptides and their associated fragment ions may be searched against a library of known proteins. Alternatively, the peptide masses or mass to charge ratios, or exact masses or mass to charge ratios, may be searched against the library of known proteins, and where more than one protein is suggested the correct protein may be confirmed by searching for fragment ions which match those to be expected from the relevant peptides from each candidate protein.

The step of identifying each final candidate parent or precursor ion preferably comprises: recalling the elution time of the final candidate parent or precursor ion, generating a list of possible candidate fragment, product, daughter or adduct ions which comprises previously recognised fragment, product, daughter or adduct ions which are present in both the low fragmentation or reaction mass spectrum obtained immediately before the elution time of the final candidate parent or precursor ion and the low fragmentation or reaction mass spectrum obtained immediately after the elution time of the final candidate parent or precursor ion, generating a mass chromatogram of each possible candidate fragment, product, daughter or adduct ion, determining the centre of each peak in each possible candidate fragment, product, daughter or adduct ion mass chromatogram, and determining the corresponding possible candidate fragment, product, daughter or adduct ion elution time(s). The possible candidate fragment, product, daughter or adduct ions may then be ranked according to the closeness of fit of their elution time with the elution time of the final candidate parent or precursor ion. A list of final candidate fragment, product, daughter or adduct ions may then be formed by rejecting possible candidate fragment, product, daughter or adduct ions if the elution time of the possible candidate fragment, product, daughter or adduct ion precedes or exceeds the elution time of the final candidate parent or precursor ion by more than a predetermined amount.

The list of final candidate fragment, product, daughter or adduct ions may be yet further refined or reduced by generating a list of neighbouring parent or precursor ions which are present in the low fragmentation or reaction mass spectrum obtained nearest in time to the elution time of the final candidate parent or precursor ion. A mass chromatogram of each parent or precursor ion contained in the list is then generated and the centre of each mass chromatogram is determined along with the corresponding neighbouring parent or precursor ion elution time(s). Any final candidate fragment, product, daughter or adduct ion having an elution time which corresponds more closely with a neighbouring parent or precursor ion elution time than with the elution time of the final candidate parent or precursor ion may then be rejected from the list of final candidate fragment, product, daughter or adduct ions.

Final candidate fragment, product, daughter or adduct ions may be assigned to a final candidate parent or precursor ion according to the closeness of fit of their elution times, and all final candidate fragment, product, daughter or adduct ions which have been associated with the final candidate parent or precursor ion may be listed.

An alternative embodiment which involves a greater amount of data processing but yet which is intrinsically simpler is also contemplated. Once parent and fragment, product, daughter or adduct ions have been identified, then a parent or precursor ion mass chromatogram for each recognised parent or precursor ion is generated. The centre of each peak in the parent or precursor ion mass chromatogram and the corresponding parent or precursor ion elution time(s) are then determined. Similarly, a fragment, product, daughter or adduct ion mass chromatogram for each recognised fragment, product, daughter or adduct ion is generated, and the centre of each peak in the fragment, product, daughter or adduct ion mass chromatogram and the corresponding fragment, product, daughter or adduct ion elution time(s) are then determined. Rather than then identifying only a sub-set of the recognised parent or precursor ions, all (or nearly all) of the recognised parent or precursor ions are then identified. Daughter, fragment, product or adduct ions are assigned to parent or precursor ions according to the closeness of fit of their respective elution times and all fragment, product, daughter or adduct ions which have been associated with a parent or precursor ion may then be listed.

Although not essential to the present invention, ions generated by the ion source may be passed through a mass filter, preferably a quadrupole mass filter, prior to being passed to the collision, fragmentation or reaction device. This presents an alternative or an additional method of recognising a fragment, product, daughter or adduct ion. A fragment, product, daughter or adduct ion may be recognised by recognising ions in a high fragmentation or reaction mass spectrum which have a mass to charge ratio which is not transmitted to the collision, fragmentation, or reaction device i.e. fragment, product, daughter or adduct ions are recognised by virtue of their having a mass to charge ratio falling outside of the transmission window of the mass filter. If the ions would not be transmitted by the mass filter then they must have been produced in the collision, fragmentation or reaction device.

Various embodiments of the present invention will now be described, by way of example only, and with reference to the accompanying drawings in which.

Figure 4A:
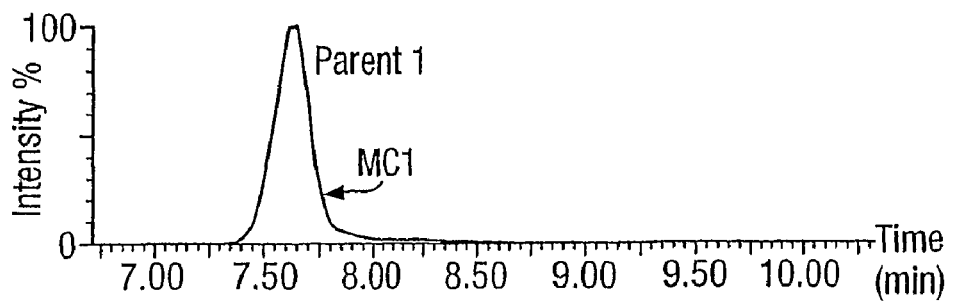
Figure 4B:
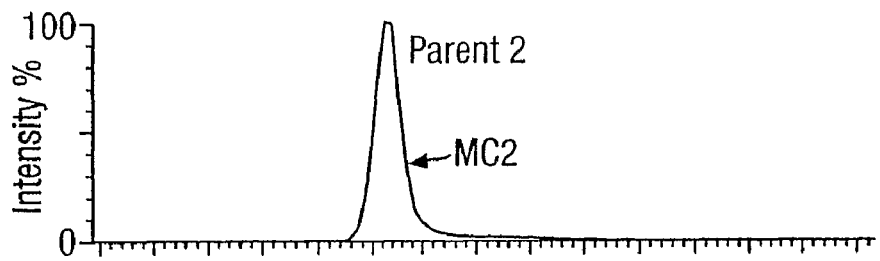
Figure 4C:
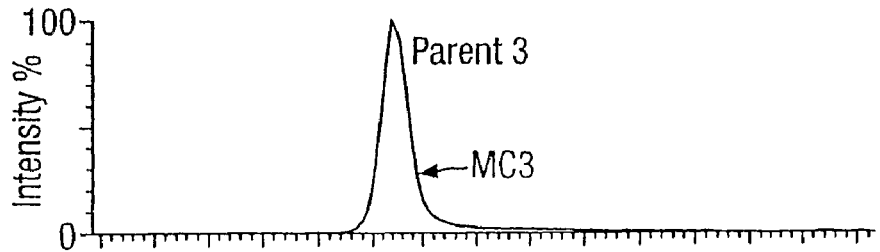
Figure 4D:
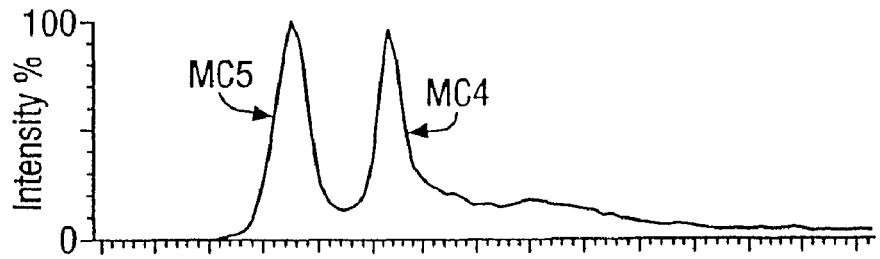
Figure 4E:
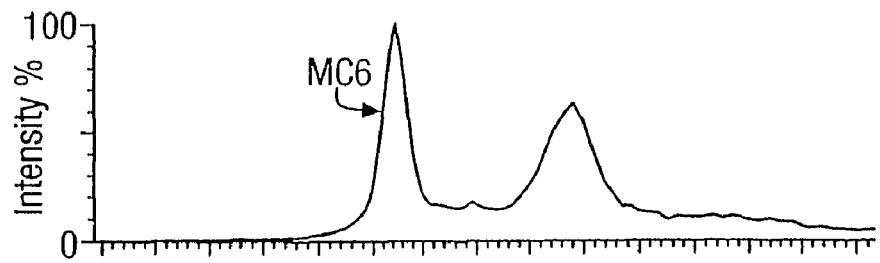
Figure 5:
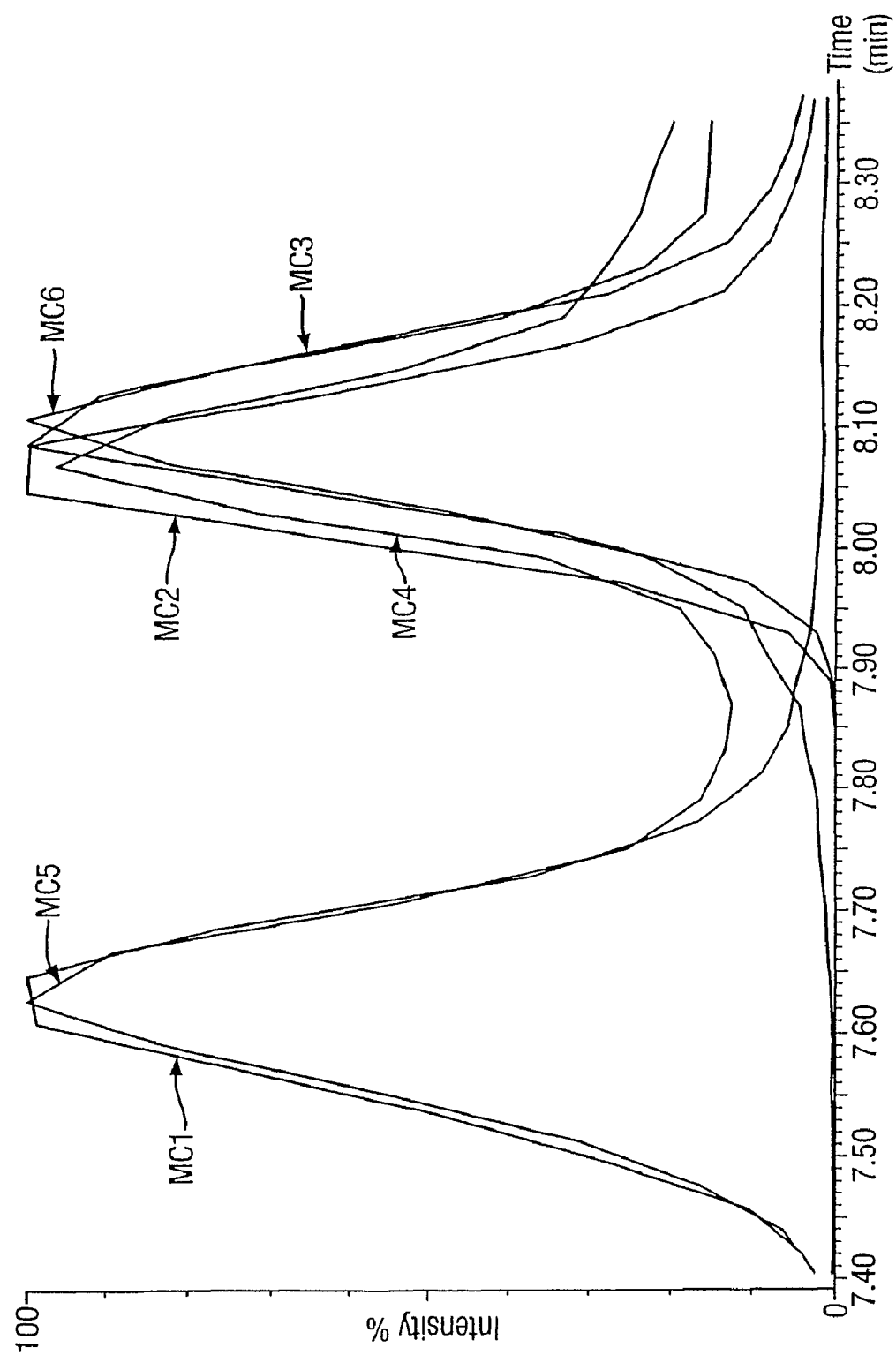
Figure 6:
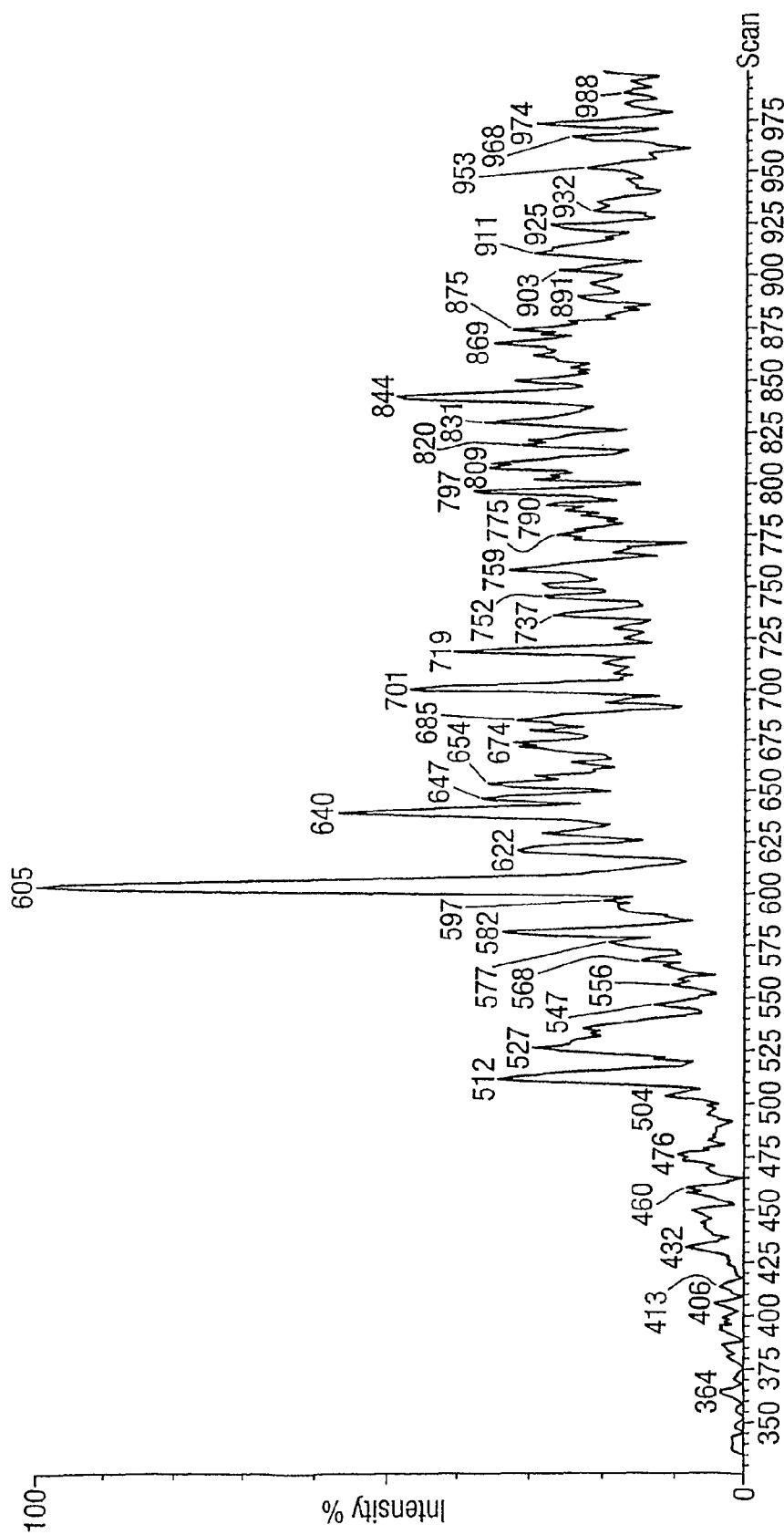
Figure 7:
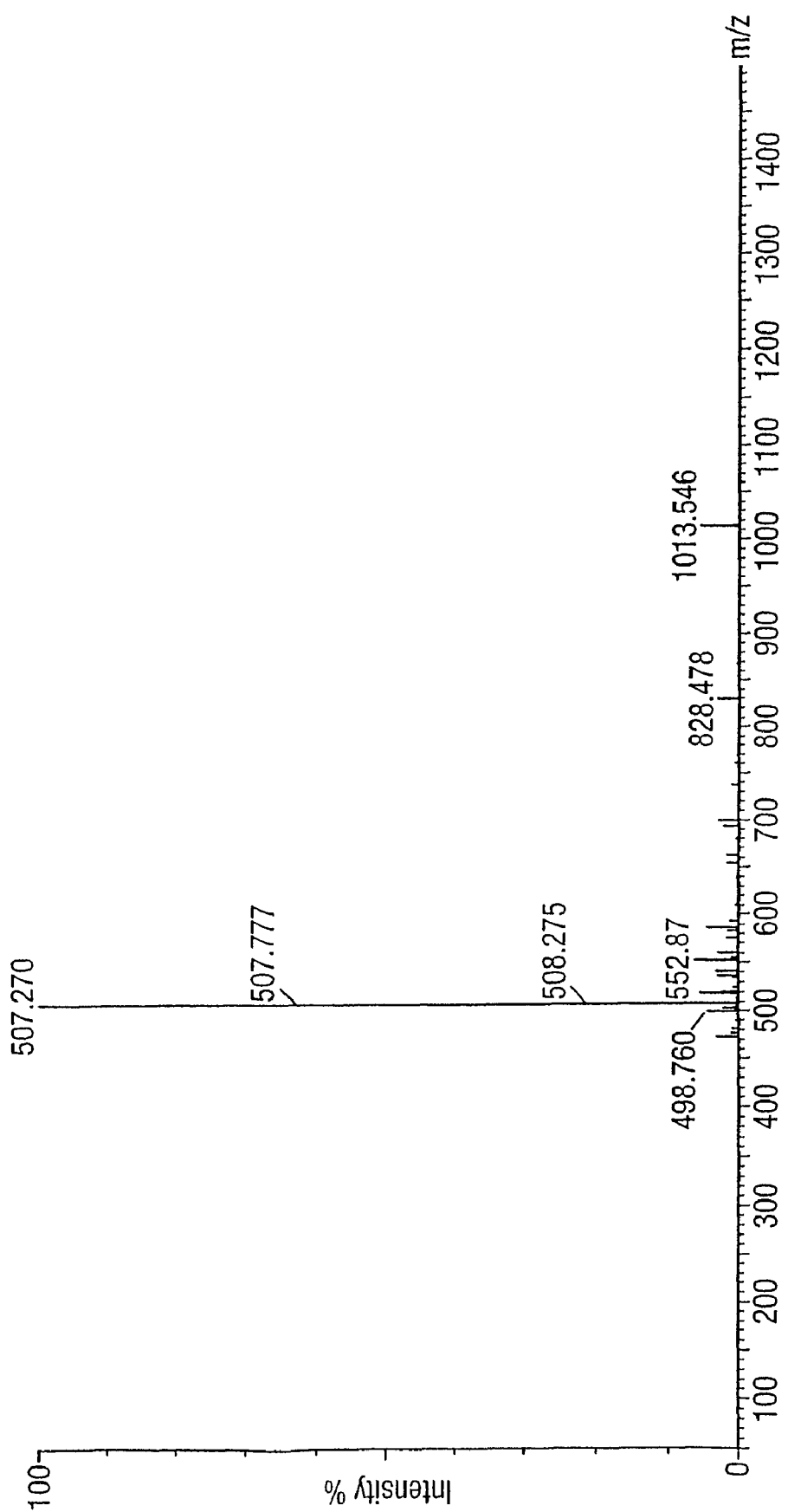
Figure 8:
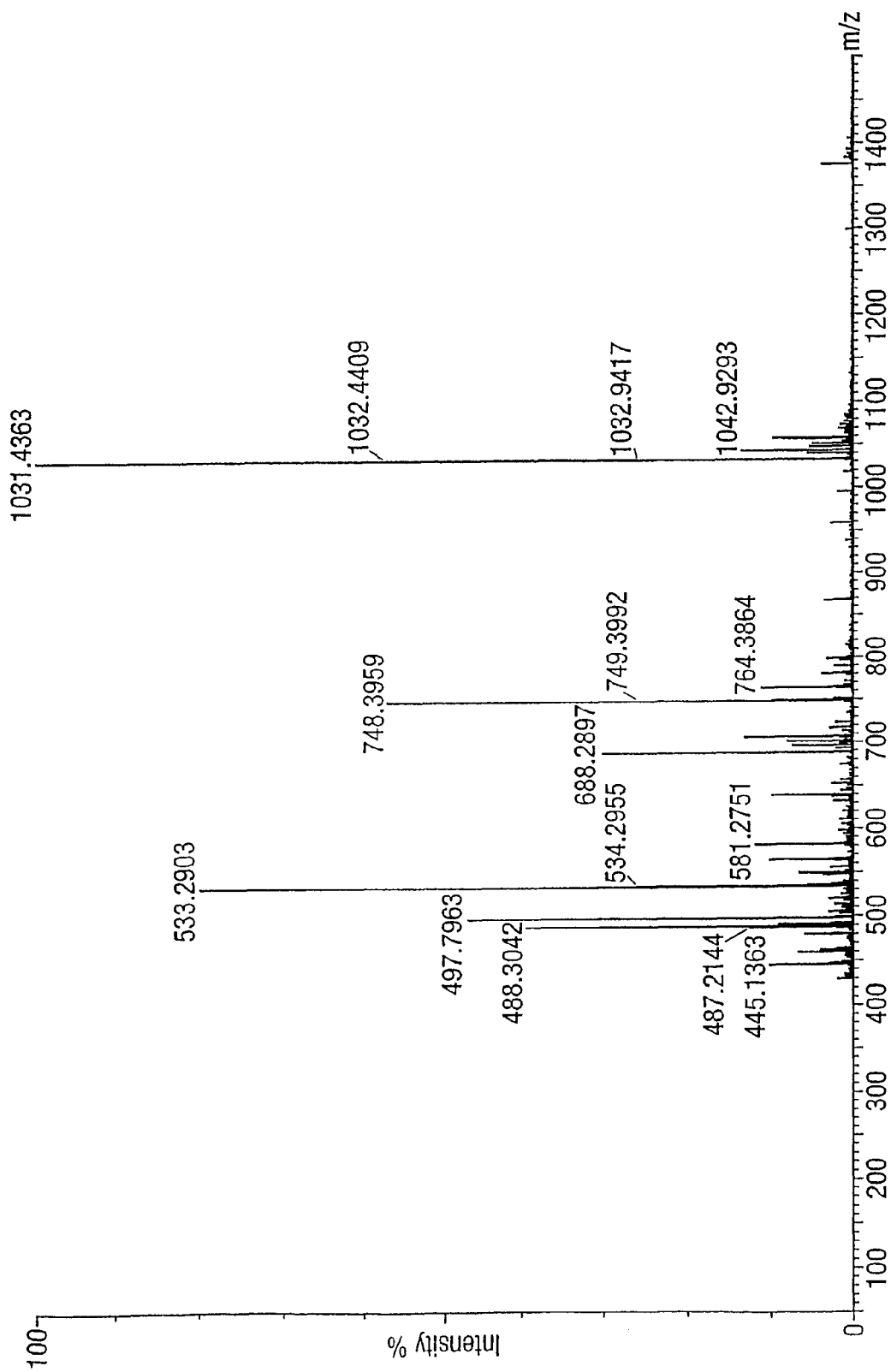
Figure 9:
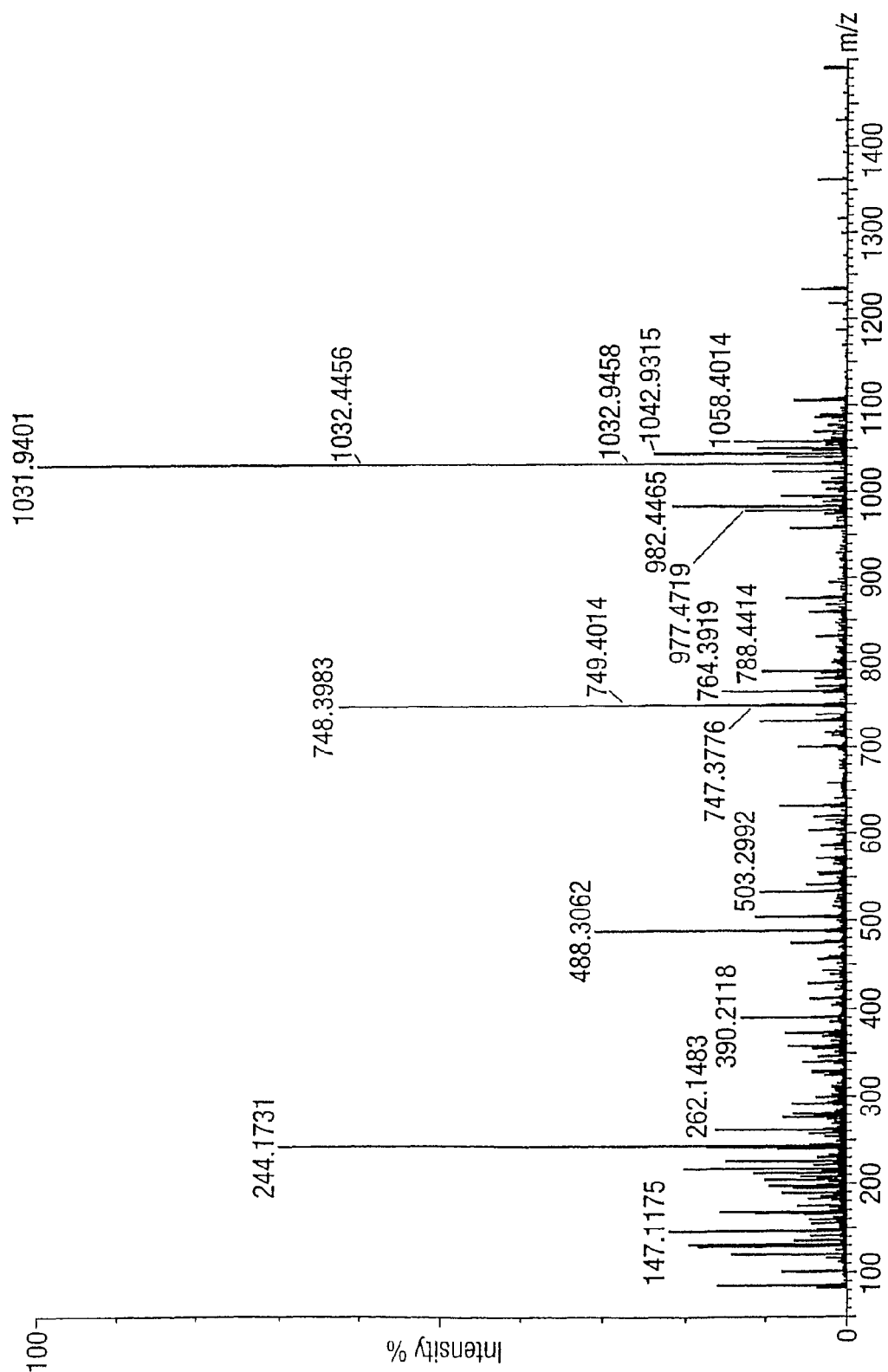
Figure 10:
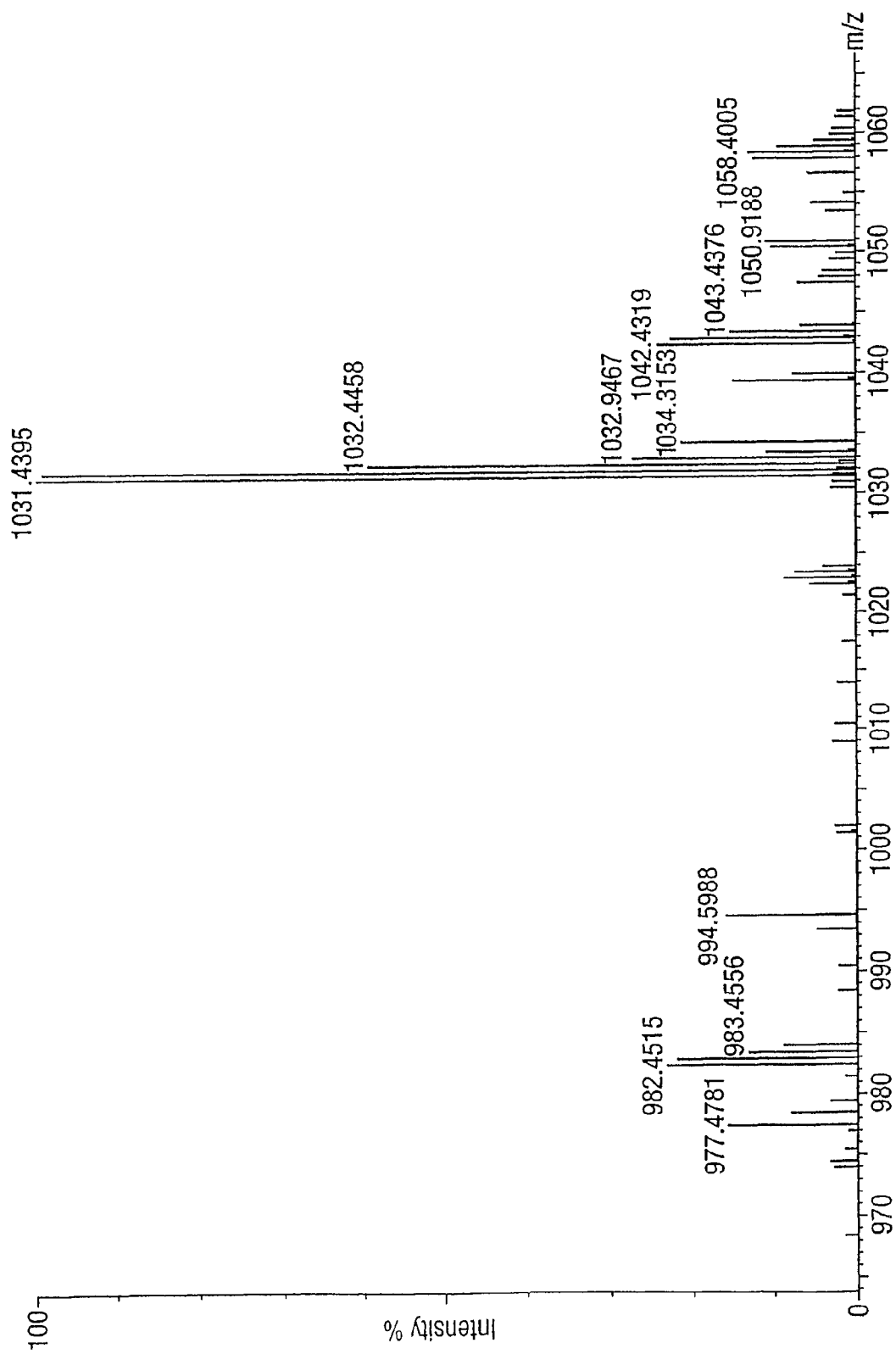

FIG. 4A shows a mass chromatogram showing the time profile of various mass ranges, FIG. 4B shows a mass chromatogram showing the time profile of various mass ranges, FIG. 4C shows a mass chromatogram showing the time profile of various mass ranges, FIG. 4D shows a mass chromatogram showing the time profile of various mass ranges, and FIG. 4E shows a mass chromatogram showing the time profile of various mass ranges;

FIG. 5 shows the mass chromatograms of FIGS. 4A-4E superimposed upon one another;

FIG. 6 shows a mass chromatogram of 87.04 (Asparagine immonium ion);

FIG. 7 shows a fragment T5 from ADH sequence ANEL-LINVK MW 1012.59;

FIG. 8 shows a mass spectrum for a low energy spectra of a tryptic digest of β-Caesin;

FIG. 9 shows a mass spectrum for a high energy spectra of a tryptic digest of β-Caesin; and FIG. 10 shows a processed and expanded view of the same spectrum as in FIG. 9.

Figure 1:
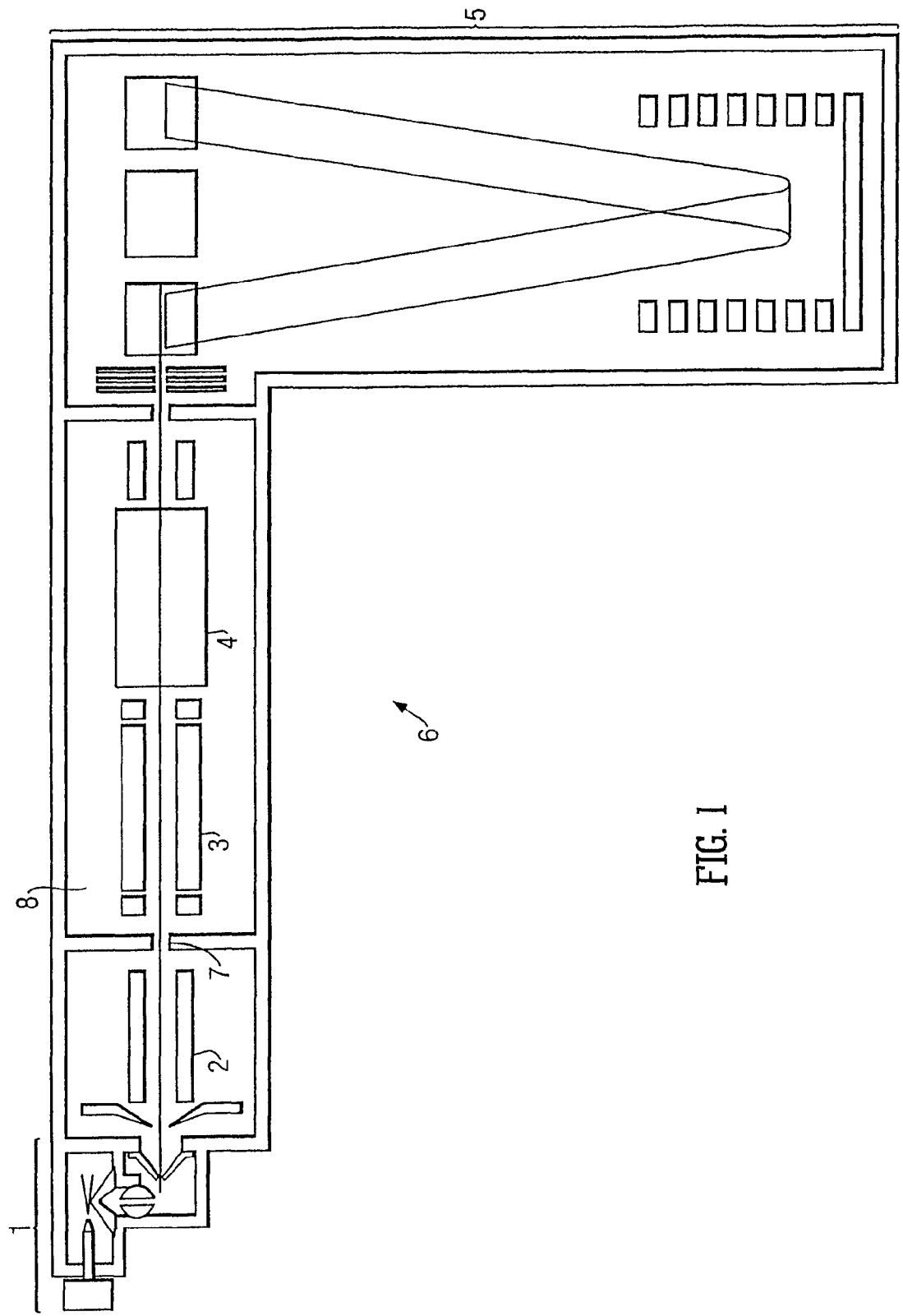
FIG. 1 is a schematic drawing of an embodiment of the present invention.

A preferred embodiment will now be described with reference to FIG. 1. A mass spectrometer 6 is provided which preferably comprises an ion source 1 preferably an Electrospray ionization source. An ion guide 2 is preferably provided downstream of the ion source 1. A quadrupole rod set mass filter 3 is preferably provided downstream of the ion guide 2 and upstream of a collision, fragmentation or reaction device 4. According to an embodiment an orthogonal acceleration Time of Flight mass analyser 5 incorporating a reflectron is preferably provided downstream of the collision, fragmentation or reaction device 4. The ion guide 2 and the mass filter 3 may be omitted if necessary. The mass spectrometer 6 is preferably interfaced with a chromatograph, such as a liquid chromatograph (not shown) so that the sample entering the ion source 1 may be taken from the eluent of the liquid chromatograph.

The quadrupole rod set mass filter 3 is preferably disposed in an evacuated chamber which is preferably maintained at a relatively low pressure e.g. less than $10^{-5}$ mbar. The rod electrodes comprising the mass filter 3 are connected to a power supply which generates both RF and DC potentials which determine the range of mass to charge values that are transmitted by the mass filter 3.

The collision, fragmentation or reaction device 4 preferably comprises a Surface Induced Dissociation ("SID") fragmentation device, an Electron Transfer Dissociation fragmentation device or an Electron Capture Dissociation fragmentation device.

According to an embodiment the collision, fragmentation or reaction device 4 may comprise an Electron Capture Dissociation fragmentation device. According to this embodiment multiply charged analyte ions are preferably caused to interact with relatively low energy electrons. The electrons preferably have energies of <1 eV or 1-2 eV. The electrons are preferably confined by a relatively strong magnetic field and are directed so that the electrons collide with the analyte ions which are preferably confined within an RF ion guide which is preferably arranged within the collision, fragmentation or reaction device 4. An AC or RF voltage is preferably applied to the electrodes of the RF ion guide so that a radial pseudo-potential well is preferably created which preferably acts to confine ions radially within the ion guide so that the ions can interact with the low energy electrons.

According to another embodiment the collision, fragmentation or reaction device 4 may comprise an Electron Transfer Dissociation fragmentation device. According to this embodiment positively charged analyte ions are preferably caused to interact with negatively charged reagent ions. The negatively charged reagent ions are preferably injected into an RF ion guide or ion trap located within the fragmentation device 4. An AC or RF voltage is preferably applied to the electrodes of the RF ion guide so that a radial pseudo-potential well is preferably created which preferably acts to confine ions radially within the ion guide so that the ions can interact with the negatively charged reagent ions. According to a less preferred embodiment negatively charged analyte ions may alternatively be arranged to interact with positively charged reagent ions.

According to another embodiment the collision, fragmentation or reaction device 4 may comprise a Surface Induced Dissociation fragmentation device. According to this embodiment ions are preferably directed towards a surface or target plate with a relatively low energy. The ions may, for example, be arranged to have an energy of 1-10 eV. The surface or target plate may comprise stainless steel or more preferably the surface or target plate may comprise a metallic plate coated with a monolayer of fluorocarbon or hydrocarbon. The monolayer preferably comprises a self-assembled monolayer. The surface or target plate may be arranged in a plane which is substantially parallel with the direction of travel of ions through the Surface Induced Dissociation fragmentation device in a mode of operation wherein ions are not fragmented. In a mode of operation wherein it is desired to fragment ions, the ions may be deflected onto or towards the surface or target plate so that the ions impinge the surface or target plate at a relatively shallow angle with respect to the surface of target plate. Fragment ions are preferably produced as a result of the analyte ions colliding with the surface or target plate. The fragment ions are preferably directed off or away from the surface or target plate at a relatively shallow angle with respect to the surface or target plate. The fragment ions are then preferably arranged to assume a trajectory which preferably corresponds with the trajectory of ions which are transmitted through or past the Surface Induced Dissociation fragmentation device in a mode of operation wherein ions are not substantially fragmented.

The collision, fragmentation or reaction device 4 may comprise an Electron Collision or Impact Dissociation fragmentation device wherein ions are fragmented upon collisions with relatively energetic electrons e.g. wherein the electrons have >5 eV.

According to other embodiments the collision, fragmentation or reaction device 4 may comprise a Photo Induced Dissociation ("PID") fragmentation device, a Laser Induced Dissociation fragmentation device, an infrared radiation induced dissociation device, an ultraviolet radiation induced dissociation device, a thermal or temperature source fragmentation device, an electric field induced fragmentation device, a magnetic field induced fragmentation device, an enzyme digestion or enzyme degradation fragmentation device, an ion-ion reaction fragmentation device, an ion-molecule reaction fragmentation device, an ion-atom reaction fragmentation device, an ion-metastable ion reaction fragmentation device, an ion-metastable molecule reaction fragmentation device, an ion-metastable atom reaction fragmentation device, an ion-ion reaction device for reacting ions to form adduct or product ions, an ion-molecule reaction device for reacting ions to form adduct or product ions, an ion-atom reaction device for reacting ions to form adduct or product ions, an ion-metastable ion reaction device for reacting ions to form adduct or product ions, an ion-metastable molecule reaction device for reacting ions to form adduct or product ions or an ion-metastable atom reaction device for reacting ions to form adduct or product ions.

According to an embodiment the collision, fragmentation or reaction device may form part of the ion source 1. For example, the collision, fragmentation or reaction device may comprise a nozzle-skimmer interface fragmentation device, an in-source fragmentation device or an ion-source Collision Induced Dissociation fragmentation device.

The collision, fragmentation or reaction device 4 may comprise a quadrupole or hexapole rod set ion guide in order to confine ions. The ion guide may be enclosed in a substantially gas-tight casing (other than a small ion entrance and exit orifice) into which a gas such as helium, argon, nitrogen, air or methane may be introduced at a pressure of between $10^{-4}$ and $10^{-1}$ mbar, preferably $10^{-3}$ mbar to $10^{-2}$ mbar. Suitable RF potentials for the electrodes comprising the collision, fragmentation or reaction device 4 may be provided by a power supply (not shown).

Ions generated by the ion source 1 are preferably transmitted by the ion guide 2 and pass via an interchamber orifice 7 into a vacuum chamber 8 housing the mass filter 3 and the collision, fragmentation or reaction device 4. The ion guide 2 is preferably maintained at a pressure intermediate that of the ion source 1 and the vacuum chamber 8. In the embodiment shown, ions may be mass filtered by the mass filter 3 before entering the collision, fragmentation or reaction device 4. However, mass filtering is not essential to the present invention. In a mode of operation ions are preferably fragmented or reacted within the collision, fragmentation or reaction device 4 so that a plurality of fragment, product, daughter or adduct ions are preferably produced. Fragment, product, daughter or adduct ions exiting the collision, fragmentation or reaction device 4 preferably pass into the Time of Flight mass analyser 5 arranged downstream of the collision, fragmentation or reaction device 4. Other ion optical components, such as further ion guides and/or electrostatic lenses, may be present (which are not shown in the figures or described herein) to maximise ion transmission between various parts or stages of the mass spectrometer. Various vacuum pumps (not shown) may be provided for maintaining optimal vacuum conditions in the mass spectrometer. The Time of Flight mass analyser 5 incorporating a reflectron preferably operates in a known way by measuring the transit time or time of flight of ions. Ions are preferably injected as a packet of ions into the drift or time of flight region of the mass analyzer 5. The ions become temporally separated and their mass to charge ratios can be determined by measuring the transit time or time of flight of ions through the drift or time of flight region.

A control means (not shown) preferably provides control signals for the various power supplies (not shown) which respectively provide the necessary operating potentials for the ion source 1, ion guide 2, quadrupole mass filter 3, collision, fragmentation or reaction device 4 and the Time of Flight mass analyser 5. These control signals preferably determine the operating parameters of the instrument, for example the mass to charge ratios transmitted through the mass filter 3 and the operation of the mass analyser 5. The control means is preferably controlled by signals from a computer (not shown) which may also be used to process the mass spectral data acquired. The computer may also display and store mass spectra produced from the analyser 5 and receive and process commands from an operator. The control means may be automatically set to perform various methods and make various determinations without operator intervention, or may optionally require operator input at various stages.

The control means is preferably arranged to switch, vary or alter the collision, fragmentation or reaction device 4 back and forth between at least two different modes. If the collision, fragmentation or reaction device 4 comprises an Electron Capture Dissociation fragmentation device then the electron source or beam may be switched ON in a first mode of operation and may be switched OFF in a second mode of operation. If the collision, fragmentation or reaction device 4 comprises an Electron Transfer Dissociation fragmentation device 4 then reagent ions may be injected into an ion guide or ion trap comprising analyte ions in a first mode of operation and substantially no reagent ions may be injected into the ion guide or ion trap in a second mode of operation. If the collision, fragmentation or reaction device 4 comprises a Surface Induced Dissociation fragmentation device then the analyte ions may be directed so that they collide or impinge upon the surface or target plate in a first mode of operation and the analyte ions may be directed straight past the surface or target plate in a second mode of operation so that the analyte ions do not collide or impinge upon the surface of target plate.

The control means preferably switches the collision, fragmentation or reaction device 4 between modes according to the preferred embodiment approximately once every second. When the mass spectrometer is used in conjunction with an ion source being provided with an eluent separated from a mixture by means of liquid or gas chromatography, the mass spectrometer 6 may be run for several tens of minutes over which period of time several hundred high fragmentation or reaction mass spectra and several hundred low fragmentation or reaction mass spectra may be obtained.

At the end of the experimental run the data which has been obtained is preferably analysed and parent or precursor ions and fragment, product, daughter or adduct ions are preferably recognised on the basis of the relative intensity of a peak in a mass spectrum obtained when the collision, fragmentation or reaction device 4 was in one mode compared with the intensity of the same peak in a mass spectrum obtained approximately a second later in time when the collision, fragmentation or reaction device 4 was in the second mode.

According to an embodiment, mass chromatograms for each parent and fragment, product, daughter or adduct ion are preferably generated and fragment, product, daughter or adduct ions are preferably assigned to parent or precursor ions on the basis of their relative elution times.

An advantage of the preferred method is that since all the data is acquired and subsequently processed then all fragment, product, daughter or adduct ions may be associated with a parent or precursor ion by closeness of fit of their respective elution times. This allows all the parent or precursor ions to be identified from their fragment, product, daughter or adduct ions irrespective of whether or not they have been discovered by the presence of a characteristic fragment, product, daughter or adduct ion or characteristic "neutral loss".

According to another embodiment an attempt may be made to reduce the number of parent or precursor ions of interest. A list of possible (i.e. not yet finalised) candidate parent or precursor ions is preferably formed by looking for parent or precursor ions which may have given rise to a predetermined fragment, product, daughter or adduct ion of interest e.g. an immonium ion from a peptide. Alternatively, a search may be made for parent and fragment, product, daughter or adduct ions wherein the parent or precursor ion could have fragmented into a first component comprising a predetermined ion or neutral particle and a second component comprising a fragment, product, daughter or adduct ion. Various steps may then be taken to further reduce/refine the list of possible candidate parent or precursor ions to leave a number of final candidate parent or precursor ions which are then subsequently identified by comparing elution times of the parent and fragment, product, daughter or adduct ions. As will be appreciated, two ions could have similar mass to charge ratios but different chemical structures and hence would most likely fragment differently enabling a parent or precursor ion to be identified on the basis of a fragment, product, daughter or adduct ion.

Figure 2:
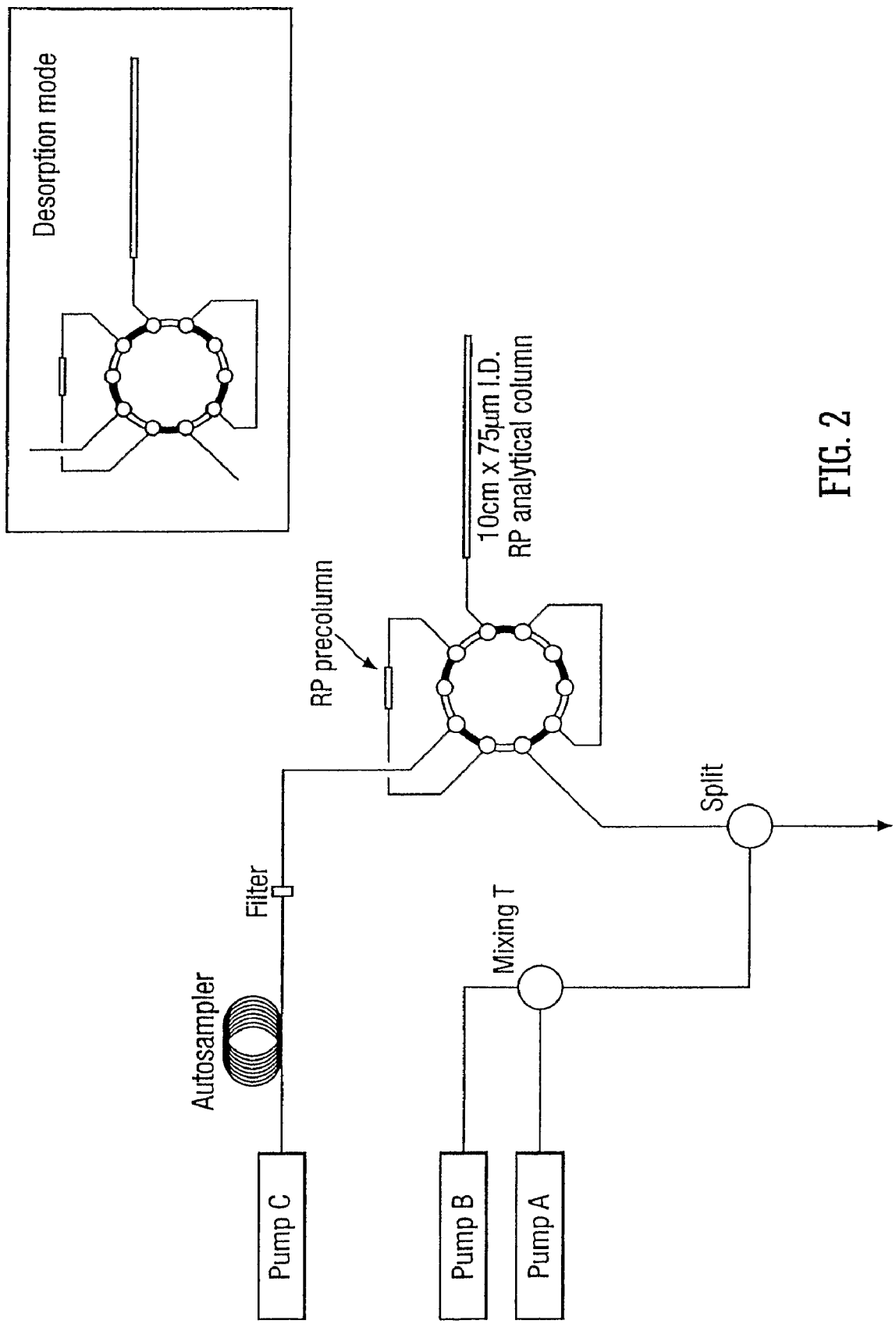
FIG. 2 shows a schematic of a valve switching arrangement during sample loading and desalting and the inset shows desorption of a sample from an analytical column.

An experiment was performed wherein samples were introduced into the mass spectrometer by means of a Micromass modular CapLC system. Samples were loaded onto a C18 cartridge (0.3 mm×5 mm) and desalted with 0.1% HCOOH for 3 minutes at a flow rate of 30 µL per minute (see FIG. 2). The ten port valve was then switched such that the peptides were eluted onto the analytical column for separation, see inset FIG. 2. The flow from pumps A and B were split to produce a flow rate through the column of approximately 200 nL/min.

The analytical column used was a PicoFrit® (www.newobjective.com) column packed with Waters® Symmetry C18 (www.waters.com). This was set up to spray directly into the mass spectrometer. The Electrospray potential (ca. 3 kV) was applied to the liquid via a low dead volume stainless steel union. A small amount (ca. 5 psi) of nebulising gas was introduced around the spray tip to aid the Electrospray process.

Data was acquired using a Q-Time of Flight2® quadrupole orthogonal acceleration Time of Flight hybrid mass spectrometer (www.micromass.co.uk) fitted with a Z-spray® nanoflow Electrospray ion source. The mass spectrometer was operated in the positive ion mode with a source temperature of 80° C. and a cone gas flow rate of 40 L/hr.

The instrument was calibrated with a multi-point calibration using selected fragment ions that resulted from the Collision Induced Decomposition (CID) of Glu-fibrinopeptide b. All data were processed using the MassLynx suite of software. Although switching a Collision Induced Decomposition fragmentation cell between two different modes of operation is not intended to fall within the scope of the present invention, the experimental results obtained nonetheless illustrate aspects of the present invention.

Figure 3A:
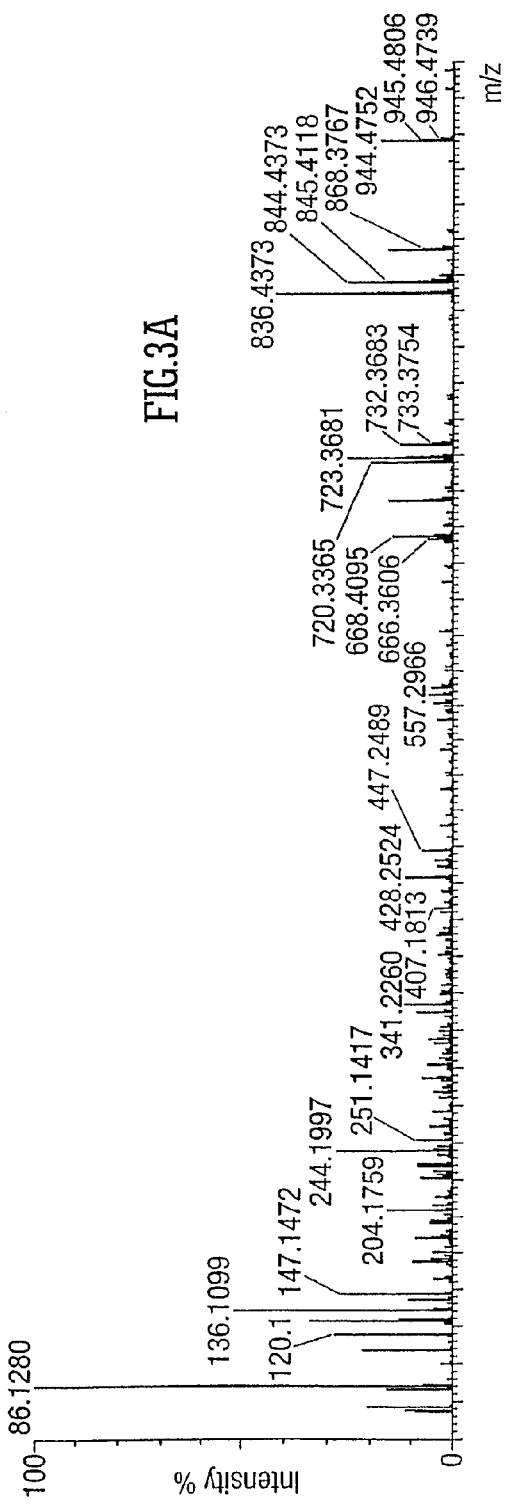
FIG. 3A shows a fragment or daughter ion mass spectrum and FIG. 3B shows a corresponding parent or precursor ion mass spectrum when a mass filter allowed parent or precursor ions having a mass to charge ratio greater than 350 to be transmitted.
Figure 3B:
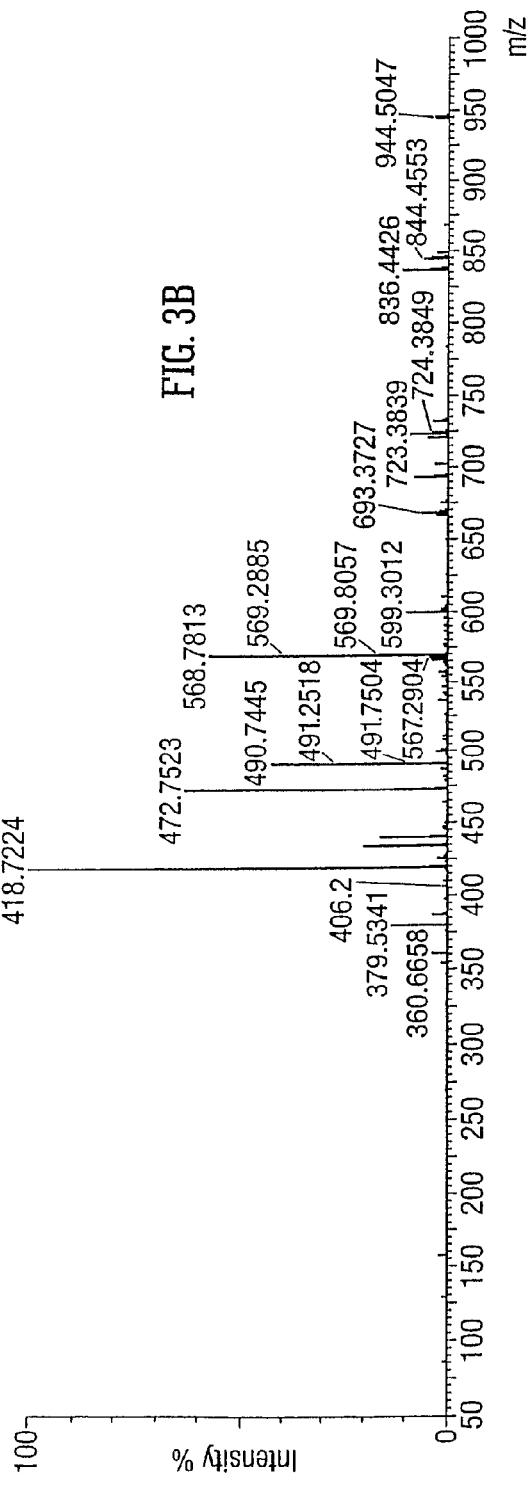

FIGS. 3A and 3B show respectively fragment or daughter and parent or precursor ion spectra of a tryptic digest of ADH known as alcohol dehydrogenase. The fragment or daughter ion spectrum shown in FIG. 3A was obtained by maintaining a gas collision cell at a relatively high potential of around 30V which resulted in significant fragmentation of ions passing therethrough. The parent or precursor ion spectrum shown in FIG. 3B was obtained at low collision energy e.g. <5V. The data presented in FIG. 3B was obtained by setting the mass filter 3 to transmit ions having a mass to charge ratio >350. The mass spectra in this particular example were obtained from a sample eluting from a liquid chromatograph. The mass spectra were obtained sufficiently rapidly and close together in time that they essentially correspond to the same component or components eluting from the liquid chromatograph.

The mass spectrum shown in FIG. 3A was obtained using a collision cell to fragment ions by Collision Induced Dissociation. Such an approach is not intended to fall within the scope of the present invention. However, the mass spectra which were obtained and the following description relating to the processing of the mass spectral data illustrate various aspects of the present invention.

In FIG. 3B, there are several high intensity peaks in the parent or precursor ion spectrum e.g. the peaks at 418.7724 and 568.7813, which are substantially less intense in the corresponding fragment ion spectrum shown in FIG. 3A. These peaks may therefore be recognised as being parent or precursor ions. Likewise, ions which are more intense in the fragment ion spectrum than in the parent or precursor ion spectrum (or indeed are not present in the parent or precursor ion spectrum due to the operation of a mass filter upstream of the collision, fragmentation or reaction device) may be recognised as being fragment ions. All of the ions having a mass to charge value <350 in FIG. 3A can therefore readily be recognised as being fragment ions either on the basis that they have a mass to charge value less than 350 or more preferably on the basis of their relative intensity with respect to the corresponding parent or precursor ion spectrum.

FIGS. 4A-4E show respectively mass chromatograms (i.e. plots of detected ion intensity versus acquisition time) for three parent or precursor ions and two fragment or daughter ions. The parent or precursor ions were determined to have mass to charge ratios of 406.2 (peak "MC1"), 418.7 (peak "MC2") and 568.8 (peak "MC3") and the two fragment or daughter ions were determined to have mass to charge ratios of 136.1 (peaks "MC4" and "MC5") and 120.1 (peak "MC6").

It can be seen that parent or precursor ion peak MC1 correlates well with fragment or daughter ion peak MC5 i.e. a parent or precursor ion with m/z=406.2 seems to have fragmented to produce a fragment or daughter ion with m/z=136.1. Similarly, parent or precursor ion peaks MC2 and MC3 correlate well with fragment or daughter ion peaks MC4 and MC6. However, it is difficult to determine which of parent or precursor ion peaks MC2 and MC3 corresponds with which of fragment or daughter ion peaks MC4 and MC6.

FIG. 5 shows the peaks of FIGS. 4A-4E overlaid on top of one other (drawn at a different scale). By careful comparison of the peaks of MC2, MC3, MC4 and MC6 it can be seen that parent or precursor ion MC2 and fragment or daughter ion MC4 correlate well and parent or precursor ion MC3 correlates well with fragment or daughter ion MC6. This suggests that parent or precursor ions with m/z=418.7 fragmented to produce fragment or daughter ions with m/z=136.1 and that parent or precursor ions with m/z=568.8 fragmented to produce fragment or daughter ions with m/z=120.1.

This cross-correlation of mass chromatograms can be carried out by an operator or more preferably by automatic peak comparison means such as a suitable peak comparison software program running on a suitable computer.

FIG. 6 shows a mass chromatogram for m/z 87.04 extracted from a HPLC separation and mass analysis obtained using a Micromass Q-TOF® mass spectrometer.

The immonium ion for the amino acid Asparagine has a m/z value of 87.04. This chromatogram was extracted from all the high energy spectra recorded on the mass spectrometer.

FIG. 7 shows a full mass spectrum corresponding to scan number 604. This was a low energy (or parent ion) mass spectrum recorded on the mass spectrometer and is the low energy spectrum next to the high energy (or fragmentation) spectrum at scan 605 that corresponds to the largest peak in the mass chromatogram of m/z 87.04. This shows that the parent or precursor ion for the Asparagine immonium ion at m/z 87.04 has a mass of 1012.54 since it shows a singly charged $(M+H)^+$ ion at m/z 1013.54 and a doubly charged $(M+2H)^{++}$ ion at m/z 507.27.

FIG. 8 shows a mass spectrum from the low energy (or parent ion) spectra recorded on a Q-TOF® mass spectrometer of a tryptic digest of the protein β-Caesin. The protein digest products were separated by HPLC and were then mass analysed. The mass spectra were recorded on the mass spectrometer operating in a MS mode and wherein a gas collision fragmentation cell was repeatedly switched between low and high collision energy for successive spectra.

FIG. 9 shows a mass spectrum from the high energy spectra recorded during the same period of the HPLC separation as that in FIG. 8 above.

FIG. 10 shows a processed and expanded view of the same mass spectrum as shown in FIG. 9 above. For this spectrum, the continuum data has been processed in order to identify peaks and display as lines with heights proportional to the peak area and annotated with masses corresponding to their centroided masses. The peak at m/z 1031.4395 is the doubly charged $(M+2H)^{++}$ ion of a peptide and the peak at m/z 982.4515 is a doubly charged fragment ion. It has to be a fragment or daughter ion since it is not present in the low energy spectrum. The mass difference between these ions is 48.9880. The theoretical mass for $H_3PO_4$ is 97.9769 and the m/z value for the doubly charged $H_3PO_4^{++}$ ion is 48.9884 a difference of only 8 ppm from that observed.

Although the present invention has been described with reference to preferred embodiments, it will be understood by those skilled in the art that various changes in form and detail may be made without departing from the scope of the invention as set forth in the accompanying claims.

The invention claimed is:

1. A method of mass spectrometry comprising the steps of:
    (a) providing an ion source for generating parent or precursor ions;
    (b) passing said parent or precursor ions to a collision, fragmentation or reaction device comprising an Electron Capture Dissociation fragmentation device downstream of said ion source;
    (c) operating said Electron Capture Dissociation fragmentation device in a first mode of operation wherein at least some of said parent or precursor ions are fragmented upon interacting with electrons to produce fragment or daughter ions;
    (d) recording a mass spectrum of said fragment or daughter ions as a first mass spectrum;
    (e) switching, altering or varying said Electron Capture Dissociation fragmentation device to operate in a second mode wherein substantially fewer parent or precursor ions are fragmented;
    (f) recording a mass spectrum of ions emerging from or which have been transmitted through said Electron Capture Dissociation fragmentation device operating in said second mode as a second mass spectrum; and
    (g) repeating steps (c)-(f) a plurality of times.

2. A method as claimed in claim 1, wherein in said first mode of operation:
    (i) said electrons have an energy selected from the group consisting of: (i)<1 eV; (ii) 1-2 eV; (iii) 2-3 eV; (iv) 3-4 eV; and (v) 4-5 eV; or
    (ii) said electrons are confined by a magnetic field.

3. A method as claimed in claim 1, further comprising providing an electron source, wherein in said first mode of operation said electron source generates a plurality of electrons which are arranged to interact with said parent or precursor ions and wherein in said second mode of operation said electron source is switched OFF.

4. A method of mass spectrometry comprising the steps of:
    (a) providing an ion source for generating parent or precursor ions;
    (b) passing said parent or precursor ions to a collision, fragmentation or reaction device comprising an Electron Transfer Dissociation fragmentation device downstream of said ion source;
    (c) operating said Electron Transfer Dissociation fragmentation device in a first mode of operation wherein at least some of said parent or precursor ions are fragmented upon interacting with reagent ions to produce fragment or daughter ions;
    (d) recording a mass spectrum of said fragment or daughter ions as a first mass spectrum;
    (e) switching, altering or varying said Electron Transfer Dissociation fragmentation device to operate in a second mode wherein substantially fewer parent or precursor ions are fragmented;
    (f) recording a mass spectrum of ions emerging from or which have been transmitted through said Electron Transfer Dissociation fragmentation device operating in said second mode as a second mass spectrum; and
    (g) repeating steps (c)-(f) a plurality of times by automatically switching, altering or varying said collision, fragmentation or reaction device between at least said first mode and said second mode at least once every 0.1, 0.2, 0.3, 0.4, 0.5, 0.6, 0.7, 0.8, 0.9, 1, 2, 3, 4, 5, 6, 7, 8, 9 or 10 seconds.

5. A method as claimed in claim 1, comprising automatically switching, altering or varying said collision, fragmentation or reaction device between at least said first mode and said second mode at least once every 0.1, 0.2, 0.3, 0.4, 0.5, 0.6, 0.7, 0.8, 0.9, 1, 2, 3, 4, 5, 6, 7, 8, 9 or 10 seconds.

6. A method as claimed in claim 1, further comprising:
    (i) the step of recognising parent or precursor ions by:
    comparing a first mass spectrum with a second mass spectrum obtained at substantially the same time; and
    recognising as parent or precursor ions, ions having a greater intensity in the second mass spectrum relative to the first mass spectrum; or
    (ii) the step of recognising fragment, product, daughter or adduct ions by:
    comparing a first mass spectrum with a second mass spectrum obtained at substantially the same time; and
    recognising as fragment, product, daughter or adduct ions, ions having a greater intensity in the first mass spectrum relative to the second mass spectrum.

7. A method as claimed in claim 1, further comprising identifying a protein:
    (i) by determining the mass to charge ratio of one or more parent or precursor ions, said one or more parent or precursor ions comprising peptides of said protein; or
    (ii) by determining the mass to charge ratio of one or more fragment, product, daughter or adduct ions, said one or more fragment, product, daughter or adduct ions comprising fragments or peptides of said protein.

8. A method as claimed in claim 7, further comprising searching the mass to charge ratios of said one or more parent or precursor ions or said one or more fragment, product, daughter or adduct ions against a database, said database comprising known proteins.

9. A mass spectrometer comprising:
an ion source for generating parent or precursor ions;
a collision, fragmentation or reaction device comprising an Electron Capture Dissociation fragmentation device downstream of said ion source, said Electron Capture Dissociation fragmentation device being operable in a first mode of operation wherein at least some of said parent or precursor ions are fragmented upon interacting with electrons to produce fragment or daughter ions and a second mode of operation wherein substantially fewer parent or precursor ions are fragmented;
a mass analyser; and
control means arranged and adapted to repeatedly switch, alter or vary said Electron Capture Dissociation fragmentation device back and forth between said first and second modes of operation.

10. A mass spectrometer comprising:
an ion source for generating parent or precursor ions;
a collision, fragmentation or reaction device comprising an Electron Transfer Dissociation fragmentation device downstream of said ion source, said Electron Transfer Dissociation fragmentation device being operable in a first mode of operation wherein at least some of said parent or precursor ions are fragmented upon interacting with reagent ions to produce fragment or daughter ions and a second mode of operation wherein substantially fewer parent or precursor ions are fragmented;
a mass analyser; and
control means arranged and adapted to repeatedly switch, alter or vary said Electron Transfer Dissociation fragmentation device back and forth between said first and second modes of operation by automatically switching, altering or varying said collision, fragmentation or reaction device between at least said first mode and said second mode at least once every 0.1, 0.2, 0.3, 0.4, 0.5, 0.6, 0.7, 0.8, 0.9, 1, 2, 3, 4, 5, 6, 7, 8, 9 or 10 seconds.

11. A mass spectrometer as claimed in claim 10, further comprising:
(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; and (xviii) a Thermospray ion source; or (b) a mass filter arranged upstream of said collision, fragmentation, or reaction device, wherein said mass filter preferably comprises a quadrupole rod set mass filter; or (c) an ion trap or ion guide arranged upstream or downstream of said collision, fragmentation or reaction device, wherein said ion trap or ion guide is selected from the group consisting of:
(i) a multipole rod set or a segmented multipole rod set ion trap or ion guide comprising a quadrupole rod set a hexapole rod set, an octapole rod set or a rod set comprising more than eight rods;
(ii) an ion tunnel or ion funnel ion trap or ion guide comprising a plurality of electrodes or at least 2, 5, 10, 20, 30, 40, 50, 60, 70, 80, 90 or 100 electrodes having apertures through which ions are transmitted in sue, wherein at least 5%, 10%, 15%, 20%, 25%, 30%, 35%, 40%, 45%, 50%, 55%, 60%, 65%, 70%, 75%, 80%, 85%, 90%, 95% or 100% of said electrodes have apertures which are of substantially the same size or area or which have apertures which become progressively larger and/or smaller in size or in area;
(iii) a stack or array of planar, plate or mesh electrodes, wherein said stack or array of planar, plate or mesh electrodes comprises a plurality or at least 2, 3, 4, 5, 6, 7, 8, 9, 10, 11, 12, 13, 14, 15, 16, 17, 18, 19 or 20 planar, plate of mesh electrodes and wherein at least 5%, 10%, 15%, 20%, 25%, 30%, 35%, 40%, 45%, 50%, 55%, 60%, 65%, 70%, 75%, 80%, 85%, 90%, 95% or 100% of said planar, plate or mesh electrodes are arranged generally in the plane in which ions travel in use; and
(iv) an ion trap or ion guide comprising a plurality of groups of electrodes arranged axially along the length of the ion trap or ion guide, wherein each group of electrodes comprises: (a) a first and a second electrode and means for applying a DC voltage or potential to said first and second electrodes in order to confine ions in a first radial direction within said ion guide; and (b) a third and a fourth electrode and means for applying an AC or RF voltage to said third and fourth electrodes in order to confine ions in a second radial direction within said ion guide.

12. A mass spectrometer as claimed in claim 11, wherein said ion source comprises a pulsed or continuous ion source and wherein said ion source is provided with an eluent over a period of time, said eluent having been separated from a mixture by means of liquid chromatography or capillary electrophoresis or by means of gas chromatography.

13. A mass spectrometer as claimed in claim 10, wherein said mass analyser is selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; (xiv) an axial acceleration Time of Flight mass analyser; and (xv) a quadrupole rod set mass filter or mass analyser.

14. A method of mass spectrometry comprising the steps of:
(a) providing an ion source for generating parent or precursor ions;

(b) passing parent or precursor ions to a collision, fragmentation or reaction device downstream of said ion source selected from the group consisting of: (i) a Surface Induced Dissociation fragmentation device; (ii) an Electron Collision or Impact Dissociation fragmentation device; (iii) a Laser Induced Dissociation fragmentation device; (iv) an infrared radiation induced dissociation device; (v) an ultraviolet radiation induced dissociation device; (vi) a nozzle-skimmer interface fragmentation device; (vii) a thermal or temperature source fragmentation device; (viii) an electric field induced fragmentation device; (ix) a magnetic field induced fragmentation device; (x) an enzyme digestion or enzyme degradation fragmentation device; (xi) an ion-ion reaction fragmentation device; (xii) an ion-molecule reaction fragmentation device; (xiii) an ion-atom reaction fragmentation device; (xiv) an ion-metastable ion reaction fragmentation device; (xv) an ion-metastable molecule reaction fragmentation device; (xvi) an ion-metastable atom reaction fragmentation device; (xvii) an ion-ion reaction device for reacting ions to form adduct or product ions; (xviii) an ion-molecule reaction device for reacting ions to form adduct or product ions; (xix) an ion-atom reaction device for reacting ions to form adduct or product ions; (xx) an ion-metastable ion reaction device for reacting ions to form adduct or product ions; (xxi) an ion-metastable molecule reaction device for reacting ions to form adduct or product ions; and (xxii) an ion-metastable atom reaction device for reacting ions to form adduct or product ions;

(c) operating said collision, fragmentation or reaction device in a first mode of operation wherein at least some of said parent or precursor ions are fragmented or reacted to produce fragment, daughter, product or adduct ions;

(d) recording a mass spectrum of said fragment, daughter, product or adduct ions are a first mass spectrum;

(e) switching, altering or varying said collision, fragmentation or reaction device to operate in a second mode wherein substantially fewer parent or precursor ions are fragmented or reacted;

(f) recording a mass spectrum of ions emerging from or which have been transmitted through said collision, fragmentation or reaction device operating in said second mode as a second mass spectrum; and (g) repeating steps (c)-(f) a plurality of times.

15. A mass spectrometer comprising:
an ion source for generating parent or precursor ions;
a collision, fragmentation or reaction device downstream of said ion source, said collision, fragmentation or reaction device being operable in a first mode of operation wherein at least some of said parent or precursor ions are fragmented or reacted to produce fragment, daughter, product or adduct ions and a second mode of operation wherein substantially fewer parent or precursor ions are fragmented or reacted;
a mass analyser; and
control means arranged and adapted to repeatedly switch, alter or vary said collision, fragmentation or reaction device back and forth between said first and second modes of operation;
wherein said collision, fragmentation or reaction device is selected from the group consisting of: (i) a Surface Induced Dissociation fragmentation device; (ii) an Electron Collision or Impact Dissociation fragmentation device; (iii) a Laser Induced Dissociation fragmentation device; (iv) an infrared radiation induced dissociation device; (v) an ultraviolet radiation induced dissociation device; (vi) a nozzle-skimmer interface fragmentation device; (vii) a thermal or temperature source fragmentation device; (viii) an electric field induced fragmentation device; (ix) a magnetic field induced fragmentation device; (x) an enzyme digestion or enzyme degradation fragmentation device; (xi) an ion-ion reaction fragmentation device; (xii) an ion-molecule reaction fragmentation device; (xiii) an ion-atom reaction fragmentation device; (xiv) an ion-metastable ion reaction fragmentation device; (xv) an ion-metastable molecule reaction fragmentation device; (xvi) an ion-metastable atom reaction fragmentation device; (xvii) an ion-ion reaction device for reacting ions to form adduct or product ions; (xviii) an ion-molecule reaction device for reacting ions to form adduct or product ions; (xix) an ion-atom reaction device for reacting ions to form adduct or product ions; (xx) an ion-metastable ion reaction device for reacting ions to form adduct or product ions; (xxi) an ion-metastable molecule reaction device for reacting ions to form adduct or product ions; and (xxii) an ion-metastable atom reaction device for reacting ions to form adduct or product ions.

16. A method as claimed in claim 4, further comprising:
(i) the step of recognising parent or precursor ions by:
comparing a first mass spectrum with a second mass spectrum obtained at substantially the same time; and
recognising as parent or precursor ions, ions having a greater intensity in the second mass spectrum relative to the first mass spectrum; or
(ii) the step of recognising fragment, product, daughter or adduct ions by:
comparing a first mass spectrum with a second mass spectrum obtained at substantially the same time; and
recognising as fragment, product, daughter or adduct ions, ions having a greater intensity in the first mass spectrum relative to the second mass spectrum.

17. A method as claimed in claim 4, further comprising identifying a protein:
(i) by determining the mass to charge ratio of one or more parent or precursor ions, said one or more parent or precursor ions comprising peptides of said protein; or
(ii) by determining the mass to charge ratio of one or more fragment, product, daughter or adduct ions, said one or more fragment, product, daughter or adduct ions comprising fragments or peptides of said protein.

18. A mass spectrometer as claimed in claim 9, further comprising:
(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; and (xviii) a Thermospray ion source; and (b) a mass filter arranged upstream of said collision, fragmentation, or reaction device, wherein said mass filter preferably comprises a quadrupole rod set mass filter; and (c) an ion trap or ion guide arranged upstream or downstream of said collision, fragmentation or reaction device, wherein said ion trap or ion guide is selected from the group consisting of:

(i) a multipole rod set or a segmented multipole rod set ion trap or ion guide comprising a quadrupole rod set a hexapole rod set, an octapole rod set or a rod set comprising more than eight rods;

(ii) an ion tunnel or ion funnel ion trap or ion guide comprising a plurality of electrodes or at least 2, 5, 10, 20, 30, 40, 50, 60, 70, 80, 90 or 100 electrodes having apertures through which ions are transmitted in sue, wherein at least 5%, 10%, 15%, 20%, 25%, 30%, 35%, 40%, 45%, 50%, 55%, 60%, 65%, 70%, 75%, 80%, 85%, 90%, 95% or 100% of said electrodes have apertures which are of substantially the same size or area or which have apertures which become progressively larger or smaller in size or in area;

(iii) a stack or array of planar, plate or mesh electrodes, wherein said stack or array of planar, plate or mesh electrodes comprises a plurality or at least 2, 3, 4, 5, 6, 7, 8, 9, 10, 11, 12, 13, 14, 15, 16, 17, 18, 19 or 20 planar, plate of mesh electrodes and wherein at least 5%, 10%, 15%, 20%, 25%, 30%, 35%, 40%, 45%, 50%, 55%, 60%, 65%, 70%, 75%, 80%, 85%, 90%, 95% or 100% of said planar, plate or mesh electrodes are arranged generally in the plane in which ions travel in use; and (iv) an ion trap or ion guide comprising a plurality of groups of electrodes arranged axially along the length of the ion trap or ion guide, wherein each group of electrodes comprises: (a) a first and a second electrode and means for applying a DC voltage or potential to said first and second electrodes in order to confine ions in a first radial direction within said ion guide; and (b) a third and a fourth electrode and means for applying an AC or RF voltage to said third and fourth electrodes in order to confine ions in a second radial direction within said ion guide.

19. A mass spectrometer as claimed in claim 9, wherein said mass analyser is selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; (xiv) an axial acceleration Time of Flight mass analyser; and (xv) a quadrupole rod set mass filter or mass analyser.

\* \* \* \* \*